(12) United States Patent
Swift et al.

(10) Patent No.: US 9,053,167 B1
(45) Date of Patent: Jun. 9, 2015

(54) STORAGE DEVICE SELECTION FOR DATABASE PARTITION REPLICAS

(71) Applicant: Amazon Technologies, Inc., Reno, NV (US)

(72) Inventors: Bjorn Patrick Swift, Seattle, WA (US); Wei Xiao, Kirkland, WA (US); Stuart Henry Seelye Marshall, Seattle, WA (US); Stefano Stefani, Issaquah, WA (US); Timothy Andrew Rath, Seattle, WA (US); David Alan Lutz, Renton, WA (US)

(73) Assignee: Amazon Technologies, Inc., Reno, NV (US)

( * ) Notice: Subject to any disclaimer, the term of this patent is extended or adjusted under 35 U.S.C. 154(b) by 131 days.

(21) Appl. No.: 13/922,001

(22) Filed: Jun. 19, 2013

(51) Int. Cl.
  *G06F 17/00* (2006.01)
  *G06F 17/30* (2006.01)

(52) U.S. Cl.
  CPC ................................ *G06F 17/30584* (2013.01)

(58) Field of Classification Search
  CPC ....................................................... G06F 17/30
  USPC ................................................. 707/600–899
  See application file for complete search history.

(56) References Cited

U.S. PATENT DOCUMENTS

| 2007/0067435 | A1 | 3/2007 | Landis et al. |
| 2008/0091740 | A1 | 4/2008 | Le Merrer et al. |
| 2008/0263001 | A1 | 10/2008 | Lohman et al. |
| 2011/0178985 | A1* | 7/2011 | San Martin Arribas et al. ........................ 707/636 |
| 2011/0191299 | A1* | 8/2011 | Huynh Huu et al. ......... 707/646 |
| 2012/0109852 | A1 | 5/2012 | Lingam et al. |
| 2012/0131093 | A1 | 5/2012 | Hamano et al. |
| 2012/0166424 | A1 | 6/2012 | Annapragada |
| 2012/0210047 | A1 | 8/2012 | Peters et al. |
| 2012/0323852 | A1 | 12/2012 | Jain et al. |
| 2013/0311424 | A1* | 11/2013 | Bartolome Rodrigo ...... 707/609 |

* cited by examiner

*Primary Examiner* — Isaac M Woo

(74) *Attorney, Agent, or Firm* — Robert C. Kowert; Meyertons, Hood, Kivlin, Kowert & Goetzel, P.C.

(57) ABSTRACT

A system that implements a data storage service may store data in multiple replicated partitions on respective storage nodes. The selection of the storage nodes (or storage devices thereof) on which to store the partition replicas may be performed by administrative components that are responsible for partition management and resource allocation for respective groups of storage nodes (e.g., based on a global view of resource capacity or usage), or the selection of particular storage devices of a storage node may be determined by the storage node itself (e.g., based on a local view of resource capacity or usage). Placement policies applied at the administrative layer or storage layer may be based on the percentage or amount of provisioned, reserved, or available storage or IOPS capacity on each storage device, and particular placements (or subsequent operations to move partition replicas) may result in an overall resource utilization that is well balanced.

20 Claims, 16 Drawing Sheets

STORAGE DEVICE SELECTION FOR DATABASE PARTITION REPLICAS

BACKGROUND

Several leading technology organizations are investing in building technologies that sell "software-as-a-service". Such services provide access to shared storage (e.g., database systems) and/or computing resources to clients, or subscribers. Within multi-tier e-commerce systems, different resources may be allocated to subscribers and/or their applications from whole machines, to CPU, to memory, to network bandwidth, and to I/O capacity.

Database systems managing large amounts of data on behalf of users may distribute and/or replicate that data across two or more machines, often in different locations, for any of a number of reasons, including security issues, disaster prevention and recovery issues, data locality and availability issues, etc. These machines may be configured in any number of ways, including as a shared resource pool. For example, a database table may be split into two or more partitions, each of which may be replicated, and each replica may be stored on a different machine. If a partition gets too large, it may be split into smaller partitions (each stored on a different machine) or moved to another machine.

Interaction between client applications and database servers typically includes read operations (read-only queries), write operations (to store data), and update operations that can be conceptualized using a read-modify-write workflow.

Figure 1:
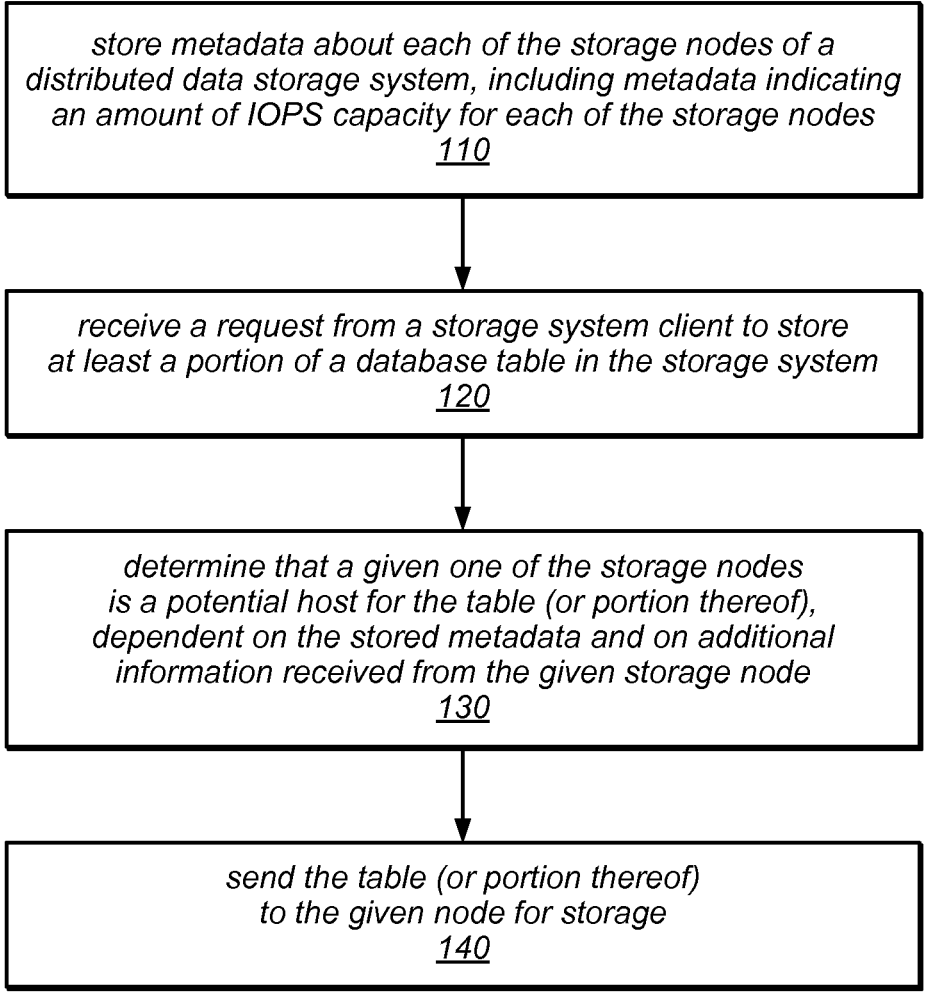
FIG. 1 is a flow diagram illustrating one embodiment of a method for placing a database table (or portion thereof) on a given storage node of a distributed database system.

While embodiments are described herein by way of example for several embodiments and illustrative drawings, those skilled in the art will recognize that the embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION

The systems and methods described herein may be employed in various combinations and in various embodiments to implement a Web-based service that provides data storage services to storage service clients (e.g., user, subscribers, or client applications that access the data storage service on behalf of users or subscribers). The service may in some embodiments support the seamless scaling of tables that are maintained on behalf of clients in a non-relational data store, e.g., a non-relational database. The service may provide a high level of durability and availability through replication, in some embodiments. For example, in some embodiments, the data storage service may store data in multiple partitions (e.g., partitions that each contain a subset of the data in a table being maintained on behalf of a client), and may store multiple replicas of those partitions on respective storage devices or virtual storage volumes of different storage nodes. As described herein, the selection of particular storage nodes and/or storage devices (or volumes) on which to store each table, partition, or replica may be determined locally (e.g., by the storage nodes themselves), centrally (e.g., by a component that manages and/or allocates resources for multiple storage nodes using global criteria), or by various combinations of local and global resource management and allocation processes, in different embodiments.

In some embodiments, the service may support automatic live repartitioning of data in response to the detection of various anomalies (e.g., failure or fault conditions, hot spots, or increases in table size and/or service request throughput), and/or explicit (e.g., pro-active and/or subscriber-initiated) live repartitioning of data to support planned or anticipated table size and/or throughput increases. In other words, the service may in some embodiments initiate the re-sizing (scaling) and/or repartitioning of a table programmatically in response to receiving one or more requests to store, retrieve, modify, or delete items in the scalable table. In some embodiments, a table may be repartitioned in response to crossing a pre-determined maximum threshold for the amount or percentage of resources (e.g., storage resource capacity or throughput capacity) that are provisioned to implement various tables, partitions, and replicas on the storage devices (or logical volumes) of a storage node. As used herein, the term "repartitioning" may be used to describe any of a variety of types of partition management operations, in different embodiments. For example, repartitioning a table may include splitting a partition (or one or more replicas of a partition) into multiple smaller partitions and/or moving one or more partitions (or replicas thereof) from one storage node (or storage device) to a different storage node (or storage device).

In various embodiments, the data storage service described herein may provide an application programming interface (API) that includes support for some or all of the following operations on the data in a table maintained by the service on behalf of a storage service client: put (or store) an item, get (or retrieve) one or more items having a specified primary key, delete an item, update the attributes in a single item, query for items using an index, and scan (e.g., list items) over the whole table, optionally filtering the items returned. The amount of work required to satisfy service requests that specify these operations may vary depending on the particular operation specified and/or the amount of data that is accessed and/or transferred between the storage system and the client in order to satisfy the request.

In some embodiments, the service (and/or the underlying system that implements the service) may support a strong consistency model, in addition to supporting eventually consistent read operations. In some embodiments, service requests made via the API may include an indication of one or more user preferences, such as a preferred consistency model, a preferred service request throughput level, or a service request throughput level for which a guarantee is requested. In other embodiments, some or all of these user preferences may be specified when a table is created, or may be client-specific, account-specific, specific to various table types, or specified by system-wide default values, rather than being specified on a per-request basis. The API may support extreme scaling and/or more predictable performance than that provided by prior data storage systems and services.

In various embodiments, the systems described herein may store data in replicated partitions on multiple storage nodes (which may be located in multiple data centers) and may implement a single master failover protocol. For example, each partition may be replicated on two or more storage nodes (or storage devices thereof) in a distributed database system, where those replicas make up a replica group. In some embodiments, membership in various replica groups may be adjusted through replicated changes, and membership and other updates in the system may be synchronized by synchronizing over a quorum of replicas in one or more data centers at failover time.

As described herein, when a database table is created, various resources may be provisioned for the implementation of that table, including storage resources (e.g., disk capacity), and throughput capacity (which may, e.g., be specified in terms of input/output requests per second, or IOPS, for read operations and/or write operations). If the table is divided into two or more partitions (e.g., if various data items are stored on different ones of the partitions according to their primary key values), the provisioned resources may also be divided among the partitions. For example, if a database table is divided into two partitions, each partition may have access to half of the total amount of storage and/or throughput resources that are provisioned and/or committed for the implementation of the table.

In some embodiments, a partition replica may be assigned to a particular storage node based (at least in part) on whether there is enough storage capacity for the anticipated size of the partition replica and/or on whether there is enough provisioned throughput capacity for the anticipated work load directed to the partition replica. For example, the anticipated size or throughput requirements for the partition replica may be based on information included in a request to create the table (or a partition thereof), on usage history for the client on whose behalf the table (or partition) was created, or on a history of accesses that target the table, the partition, or the replica itself (e.g., if this is a partition replica that is being reassigned as part of a move operation). In some embodiments, if the partition replica is assigned to a particular storage node based largely on its anticipated size, there may or may not be enough throughput capacity for the partition replica on the selected storage node (or storage device thereof). For example, a disk to which the partition replica is assigned may be oversubscribed in terms of IOPS, the actual number of IOPS may be more than was expected, or the provisioned (or committed) number of IOPS may have grown after the partition replica was created (e.g., using an UpdateTable operation to increase the provisioned throughput capacity for read operations and/or write operations). In some embodiments, an UpdateTable operation may be invoked by a client through a graphical user interface (GUI). In other embodiments, an UpdateTable operation may be invoked through an UpdateTable API whose inputs include an identifier of the table for which additional throughput capacity is desired, a desired (e.g., increased) number of IOPS for read operations and/or a desired (e.g., increased) number of IOPS for write operations. In some embodiments, if the partition replica is assigned to a particular storage node based largely on its anticipated throughput requirements, there may or may not be enough storage capacity for the partition replica on the selected storage node (or storage device thereof). In some or all of these cases, the partition replica may need to be moved to another storage node (or storage device) or split into two new (smaller) partitions, each of which may be hosted on a different storage device (or storage node).

Note that while several techniques for identifying candidate partition management operations, determining an order in which to perform them, and/or selecting appropriate storage nodes (or storage devices/volume thereof) on which to store partitions are described herein in terms of splitting or moving replicas of various database table partitions, these techniques may be more generally applicable in any situation and/or at any time in which a re-sizeable collection of data (e.g., a collection of data for which a fluctuating, "bursty", or otherwise variable amount of storage, throughput, or other resources may be provisioned and/or consumed over time) is stored in a distributed data storage system.

As described in more detail herein, moving a partition replica may involve creating one or more copies of a partition (or partition replica) on respective storage nodes (or storage devices thereof) and then redirecting at least some of the subsequent requests that target the partition to the new copy (or copies). Note that in some embodiments, an operation to split a partition may consume more resources than an operation to move a partition of similar size. For example, in some embodiments, splitting a partition into two new partitions may include duplicating all of the replicas of the partition (i.e., doubling the number of replicas), and then dividing each of them in half. In other words, an operation to split a partition may affect all of the replicas in the replica group and an additional complete set of replicas (at least until the split operation is completed).

In some embodiments of the distributed database systems described herein, each storage node may include multiple storage devices or logical volumes, each of which stores various partition replicas. For example, in one embodiment each storage node of the distributed database system may include five storage devices or logical storage volumes. In some embodiments, one or more mechanisms may be implemented on each of the storage nodes for determining, on a local level (e.g., on a storage node basis) whether and/or how to split a partition or move a partition (or a given replica of a partition), based on the current utilization of provisioned resources and/or other information. For example, one of the storage nodes may be configured to determine that a partition for which a replica is stored on one of its storage devices (e.g., disks) or logical storage volumes should be split into two new partition, and may divide the data in the partition by hash ranges, by key space ranges, or using other criteria to divide the data between the two new partitions. In another example, a storage node may be configured to determine that one or more partitions (or replicas thereof) should be moved from a given storage device or logical storage volume to another storage device or logical storage volume, e.g., in order to reduce the amount of provisioned storage capacity or throughput capacity on the given storage device or logical storage volume.

Figure 15:
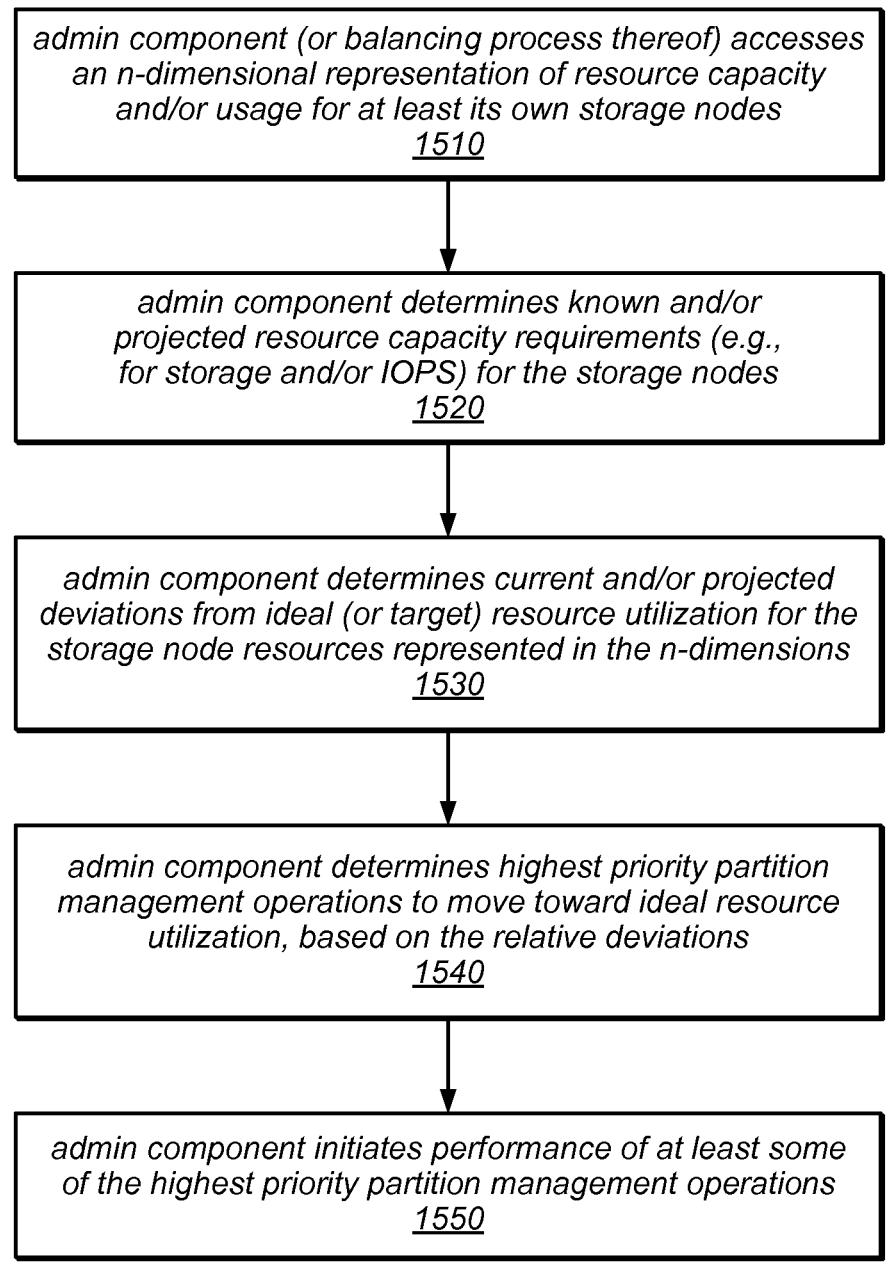
FIG. 15 is a flow diagram illustrating one embodiment of a method for performing a resource balancing operation in a distributed data storage system.

In some embodiments, once a storage node has identified a candidate partition management operation to be performed locally, it may send information about the candidate operation to a central partition management scheduler. The central partition management scheduler may apply a global prioritization scheme across all candidate partition management operations to be performed on all of the storage nodes in the distributed database system to determine the order (or relative order) in which at least some of them should be performed. In some embodiments, the order in which the candidate partition management operations are scheduled for execution may be dependent on whether they involve partition splitting operations or partition moving operations, among other things. For example, partition splitting operations may be prioritized over partition moving operations, in some embodiments. In other embodiments, a balancer process running on a central component (e.g., administrative component) may gather or accesses information about each of the storage nodes in the system (and/or their storage devices/volumes) in order to determine whether to move any partitions or replicas to better balance the resource utilization across the storage fleet (or at least across a portion of the storage fleet). One such balancing process is illustrated in FIG. 15 and described below.

In various embodiments, once a partition management operation is requested (e.g., by a client process, by a balancing process, by a failover process, or as a result of another type of trigger), the destination storage nodes (and/or devices/ volumes thereof) for those operations may be selected locally (e.g., by the storage nodes themselves), centrally (e.g., by a component that manages and/or allocates resources for multiple storage nodes using global criteria), or by various combinations of local and global resource management and allocation processes. For example, various techniques may be applied to select a storage node and/or particular storage devices/volumes on which to place a particular table, partition, or replica as part of creating a table, partitioning a table (e.g., at creation or later), replicating a table (or a partition thereof), splitting a partition (or partition replica), or moving a partition (or partition replica), some of which are described in detail herein.

One embodiment of a method for placing a database table (or portion thereof) on a given storage node of a distributed database system is illustrated by the flow diagram in FIG. 1. As illustrated at 110, in this example, the method may include storing metadata about each of the storage nodes of a distributed data storage system (e.g., one that implements a distributed database system), including metadata indicating an amount of IOPS capacity for each of the storage nodes (e.g., metadata indicating the total amount of IOPS capacity for each node, the amount of provisioned IOPS capacity for each node, the amount of reserved IOPS capacity for each node, and/or the amount of available IOPS capacity for each node). The method may also include receiving a request from a storage system client to store at least a portion of a database table in the storage system, as in 120. For example, in some embodiments, the request may be made as part of an operation to create a table, to split a table or a partition, or to move a table (or a partition or replica thereof).

As illustrated in this example, the method may include determining that a given one of the storage nodes is a potential host for the table (or portion thereof), dependent on the stored metadata and on additional information received from the given storage node, as in 130, and then sending the table (or portion thereof) to the given node for storage, as in 140. As described in more detail below, in different embodiments, the determination may include querying the storage node for information, i.e., contacting the storage node to obtain additional resource related metadata, to obtain an acknowledgement or confirmation that the storage node has sufficient resource capacity (e.g., in terms of storage capacity or IOPS capacity) to host the table (or portion thereof), to obtain confirmation of a reservation for enough resource capacity to host the table (or portion thereof), or to obtain other information, or the storage node may send additional information without being prompted to do so.

Figure 2:
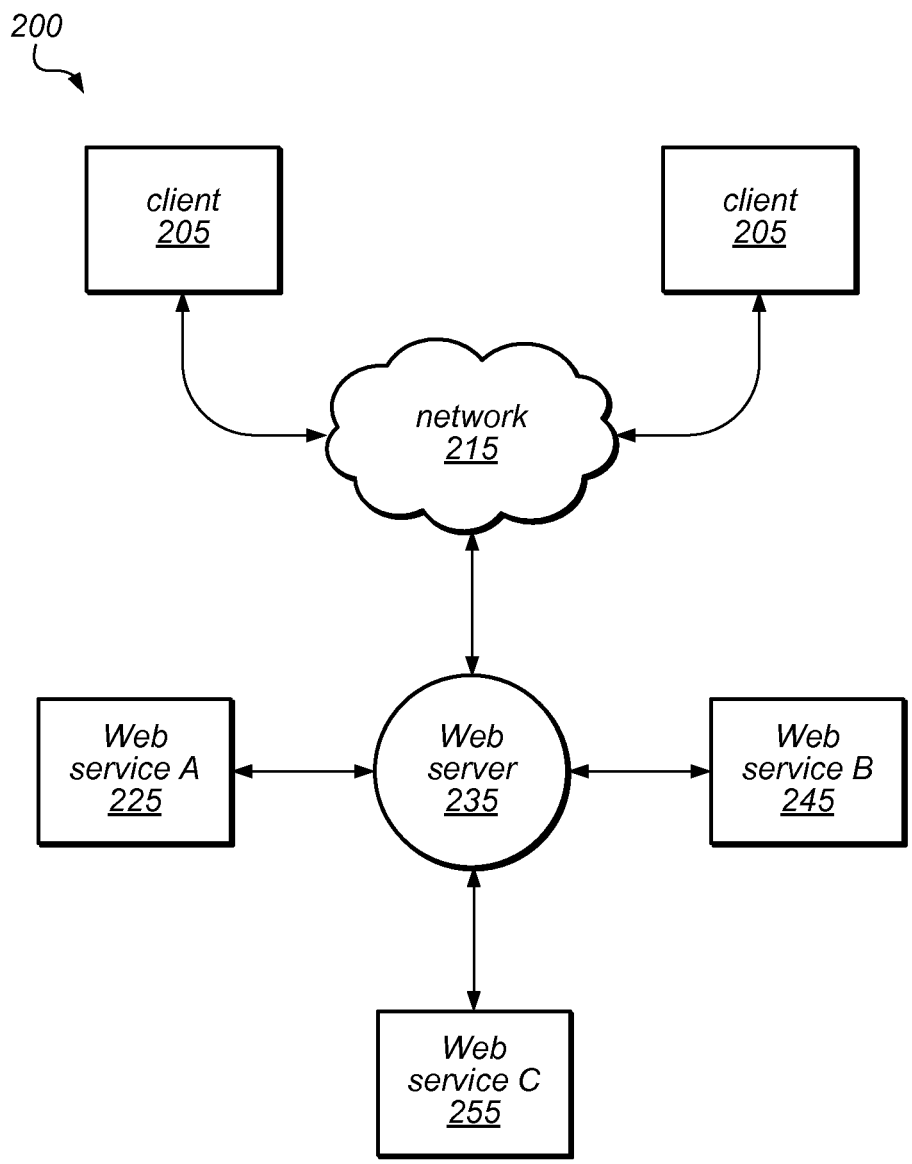
FIG. 2 is a block diagram illustrating one embodiment of a system that provides various Web-based services to clients.

Various techniques described herein may be employed in local or remote computing systems, including systems that provide services to users (e.g., subscribers) over the Internet or over other public or private networks, such as virtual private networks and connections to services in a virtual private cloud (VPC) environment. FIG. 2 illustrates a block diagram of a system that provides various Web-based services to clients, according to one embodiment. In this example, system 200 includes one or more clients 205. In this example, the clients 205 may be configured to interact with a Web server 235 via a communication network 215.

As illustrated in this example, the Web server 235 may be configured to process requests from clients 205 for various services, such as Web service A (225), Web service B (245), and Web service C (255), and to return results to the clients 205. Each of the web services may provide clients with one or more of: computational resources, database services, data storage services (e.g., maintaining data in one or more tables on behalf of a client), or any other types of services or shared resources.

Figure 3:
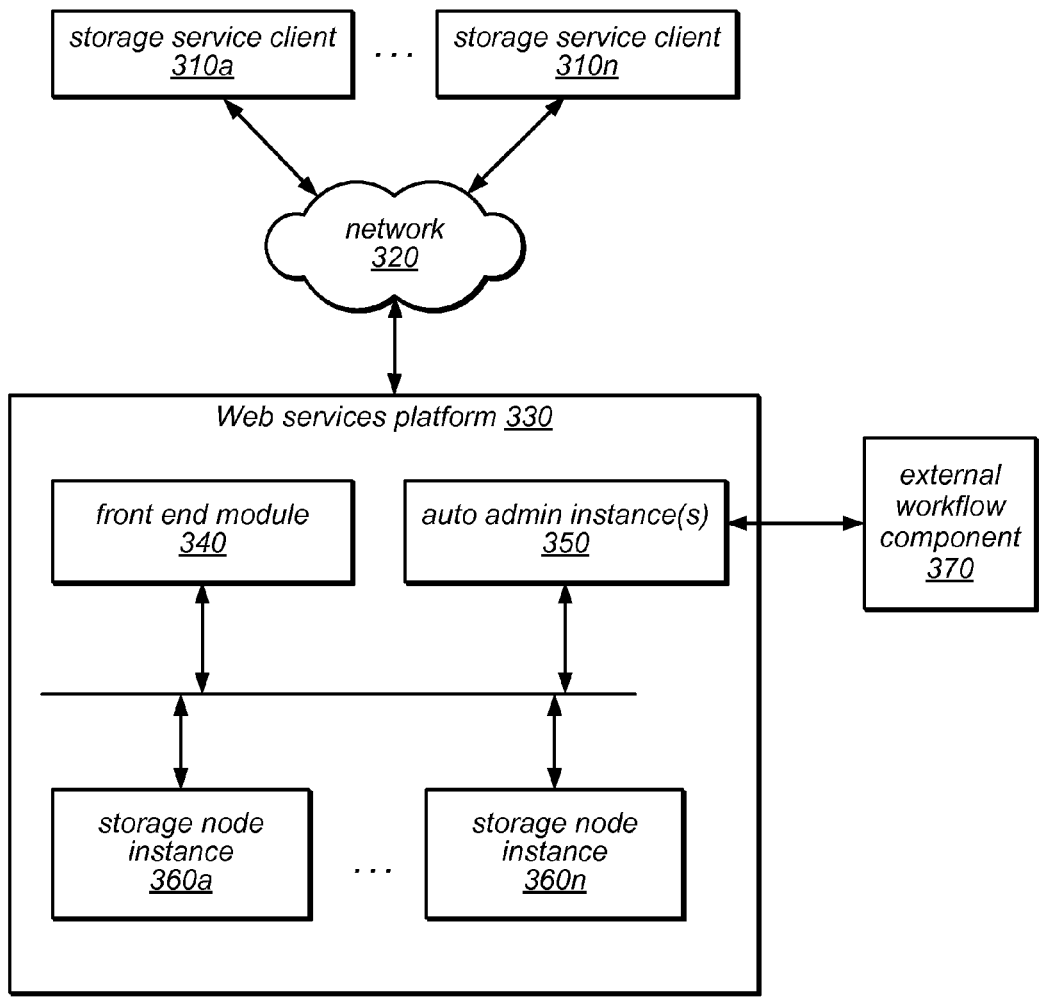
FIG. 3 is a block diagram illustrating one embodiment of a system architecture that is configured to implement a Web services-based data storage service.

One embodiment of a system architecture that is configured to implement a Web services-based data storage service such as that described herein is illustrated in FIG. 3. It is noted that where one or more instances of a given component may exist, reference to that component herein below may be made in either the singular or the plural. However, usage of either form is not intended to preclude the other. In various embodiments, the components illustrated in FIG. 3 may be implemented directly within computer hardware, as instructions directly or indirectly executable by computer hardware (e.g., a microprocessor or computer system), or using a combination of these techniques. For example, the components of FIG. 3 may be implemented by a distributed system including a number of computing nodes (or simply, nodes), such as the example computing node illustrated in FIG. 16 and described below. In various embodiments, the functionality of a given storage service system component may be implemented by a particular computing node or may be distributed across several computing nodes. In some embodiments, a given computing node may implement the functionality of more than one storage service system component.

Generally speaking, storage service clients 310a-310n may encompass any type of client configurable to submit web services requests to Web services platform 330 via network 320. For example, a given storage service client 310 may include a suitable version of a web browser, or a plug-in module or other type of code module configured to execute as an extension to or within an execution environment provided by a web browser to provide database or data storage service clients (e.g., client applications, users, and/or subscribers) access to the services provided by Web services platform 330. Alternatively, a storage service client 310 may encompass an application such as a database application, media application, office application or any other application that may make use of persistent storage resources. In some embodiments, such an application may include sufficient protocol support (e.g., for a suitable version of Hypertext Transfer Protocol (HTTP)) for generating and processing web services requests without necessarily implementing full browser support for all types of web-based data. That is, storage service client 310 may be an application configured to interact directly with Web services platform 330. In various embodiments, storage service client 310 may be configured to generate web services requests according to a Representational State Transfer (REST)-style web services architecture, a document- or message-based web services architecture, or another suitable web services architecture.

In some embodiments, storage service client 310 may be configured to provide access to web services-based storage to other applications in a manner that is transparent to those applications. For example, storage service client 310 may be configured to integrate with an operating system or file system to provide storage in accordance with a suitable variant of the storage model described herein. However, the operating system or file system may present a different storage interface to applications, such as a conventional file system hierarchy of files, directories and/or folders. In such an embodiment, applications may not need to be modified to make use of the storage system service model described herein. Instead, the details of interfacing to Web services platform 330 may be coordinated by storage service client 310 and the operating system or file system on behalf of applications executing within the operating system environment.

Storage service clients 310 may convey web services requests to and receive responses from Web services platform 330 via network 320. In various embodiments, network 320 may encompass any suitable combination of networking hardware and protocols necessary to establish web-based communications between clients 310 and platform 330. For example, network 320 may generally encompass the various telecommunications networks and service providers that collectively implement the Internet. Network 320 may also include private networks such as local area networks (LANs) or wide area networks (WANs) as well as public or private wireless networks. For example, both a given client 310 and Web services platform 330 may be respectively provisioned within enterprises having their own internal networks. In such an embodiment, network 320 may include the hardware (e.g., modems, routers, switches, load balancers, proxy servers, etc.) and software (e.g., protocol stacks, accounting software, firewall/security software, etc.) necessary to establish a networking link between given client 310 and the Internet as well as between the Internet and Web services platform 330. It is noted that in some embodiments, storage service clients 310 may communicate with Web services platform 330 using a private network rather than the public Internet. For example, clients 310 may be provisioned within the same enterprise as the data storage service (and/or the underlying system) described herein. In such a case, clients 310 may communicate with platform 330 entirely through a private network 320 (e.g., a LAN or WAN that may use Internet-based communication protocols but which is not publicly accessible).

Generally speaking, Web services platform 330 may be configured to implement one or more service endpoints configured to receive and process web services requests, such as requests to access tables maintained on behalf of clients/users by a database service or a data storage service, and/or the items and attributes stored in those tables. For example, Web services platform 330 may include hardware and/or software configured to implement various service endpoints and to properly receive and process HTTP-based web services requests directed to those endpoints. In one embodiment, Web services platform 330 may be implemented as a server system configured to receive web services requests from clients 310 and to forward them to various components that collectively implement a data storage system for processing. In other embodiments, Web services platform 330 may be configured as a number of distinct systems (e.g., in a cluster topology) implementing load balancing and other request management features configured to dynamically manage large-scale web services request processing loads.

As illustrated in FIG. 3, Web services platform 330 may include a front end module 340 (which may be configured to receive, authenticate, parse, throttle and/or dispatch service requests, among other things), one or more administrative components, or auto admin instances, 350 (which may be configured to provide a variety of visibility and/or control functions, as described in more detail herein), and a plurality of storage node instances (shown as 360a-360n), each of which may maintain and manage one or more tables on behalf of clients/users or on behalf of the data storage service (and its underlying system) itself. In some embodiments, each of the multiple auto admin instances may be responsible for managing and/or allocating the resources of a subset of the storage node instances 360 (e.g., the storage capacity and/or throughput capacity of the storage node instances 360 and/or their underlying storage devices or virtual storage volumes). For example, in some embodiments, each auto admin instance 350 may be configured to select a storage node and/or particular storage devices or virtual storage volumes on which to place various tables, partitions, and replicas, which may include receiving metadata about the storage nodes and/or storage devices/volumes, recommendations of storage devices/volumes on which to place the tables, partitions, and replicas, confirmation of resource reservations, or other information from the storage node instances for which it provides administrative functionality. Some of the functionality provided by each of these types of components is described in more detail herein, according to various embodiments.

Note that in some embodiments, Web services platform 330 may include different versions of some of the components illustrated in FIG. 3 to provide functionality for creating, accessing, and/or managing tables maintained in database instances within a single-tenant environment than those that provide functionality for creating, accessing, and/or managing tables maintained in database instances within a multi-tenant environment. In other embodiments, functionality to support both multi-tenant and single-tenant environments may be included in any or all of the components illustrated in FIG. 3. Note also that in various embodiments, one or more database instances may be implemented on each of the storage nodes 360a-360n, and each may store tables on behalf of clients. Some of these database instances may operate as if they were in a multi-tenant environment, and others may operate as if they were in a single-tenant environment. In some embodiments, database instances that operate as in a multi-tenant environment may be implemented on different computing nodes (or on different virtual machines executing on a single computing node) than database instances that operate as in a single-tenant environment.

In various embodiments, Web services platform 330 may be configured to support different types of web services requests. For example, in some embodiments, platform 330 may be configured to implement a particular web services application programming interface (API) that supports a variety of operations on tables that are maintained and managed on behalf of clients/users by the data storage service system (and/or data stored in those tables). Examples of the operations supported by such an API are described in more detail herein.

In addition to functioning as an addressable endpoint for clients' web services requests, in some embodiments Web services platform 330 may implement various client management features. For example, platform 330 may coordinate the metering and accounting of client usage of web services, including storage resources, such as by tracking the identities of requesting clients 310, the number and/or frequency of client requests, the size of tables and/or items stored or retrieved on behalf of clients 310, overall storage bandwidth used by clients 310, class of storage requested by clients 310, and/or any other measurable client usage parameter. Platform 330 may also implement financial accounting and billing systems, or may maintain a database of usage data that may be queried and processed by external systems for reporting and billing of client usage activity. In some embodiments, platform 330 may include a lock manager and/or a bootstrap configuration (not shown).

In various embodiments, a database service or data storage service may be implemented on one or more computing nodes that are configured to perform the functionality described herein. In some embodiments, the service may be implemented by a Web services platform (such as Web services platform 330 in FIG. 3) that is made up of multiple computing nodes, each of which may perform one or more of the functions described herein. Various collections of the computing nodes may be configured to provide the functionality of an auto-admin cluster, a cluster of resources dedicated to the data storage service, and a collection of external resources (which may be shared with other Web services or applications, in some embodiments).

In some embodiments, the external resources with which the system interacts to provide the functionality described herein may include an external workflow component, illustrated in FIG. 3 as external workflow component 370. External workflow component 370 may provide a framework through which other components interact with the external workflow system. In some embodiments, Web services platform 330 may include an access API built on top of that framework (not shown). This interface may allow the system to implement APIs suitable for the usage patterns expected to be experienced by the data storage service. In some embodiments, components or modules of the system that use external workflow component 370 may include these interfaces rather than interfacing directly to the interfaces provided by external workflow component 370. In some embodiments, the Web services platform 330 may rely on one or more external (and in some cases shared) resources, in addition to external workflow component 370. In some embodiments, external workflow component 370 may be used to perform distributed operations, such as those that extend beyond a particular partition replication group.

In some embodiments, the database systems described herein may support seamless scaling of user tables in a "fully shared nothing" type architecture. For example, in some embodiments, each database partition may be implemented as a completely independent parallel computation unit. In such embodiments, the system may not provide distributed coordination across partitions or support batch "put" operations and/or multi-statement transactions. In some embodiments, as long as the workload distribution is well spread across partitions, an increase in the number of partitions may result in a larger usable table size and/or increased throughput capacity for service requests. As described herein, in some embodiments, live repartitioning (whether programmatic/automatic or explicitly initiated) may be employed to adapt to workload changes. In other words, in some embodiments, repartitioning (including partition moving, partition splitting, and/or other partition management operations) may be performed while service requests directed to the affected partitions continue to be received and processed (i.e. without taking the source partition off-line).

In some embodiments, a service (and/or underlying system) may support a variety of service offerings and/or throughput models. In some embodiments, the service may support a committed work throughput offering and/or a best effort offering. In some embodiments, a committed work throughput level may be specified in terms of a measure of normalized, logical work units (or logical service request units) over time, and may represent a work throughput level that is guaranteed by the system. For example, in systems that provide database or data storage services (e.g., in tables maintained on behalf of clients), a storage service client (e.g., a client application, user, or subscriber having access to the service) may specify a preference between multiple throughput options that are offered by the service, according to a variety of business models, subscription types, and/or payment models. For example, the client/user may indicate a preferred throughput model for a particular table through a parameter of a request to create the table, in some embodiments. In other embodiments, a client/user may specify a default throughput model for all tables created and maintained on their behalf by the data storage service. By supporting both a committed throughput model and a best effort throughput model (for which no throughput guarantees are made), the system may allow clients/users to make a trade-off between performance and cost, according to their needs and/or budgets. Other types of services may support a committed work throughput model and/or other throughput models.

A data storage service (and underlying system) that provides a committed throughput offering may be configured to pre-allocate capacity and/or resources for the creation, growth, and management of a table maintained on behalf of a client/user in response to traffic directed to the table, and not to overbook the resources and/or capacity of the storage node(s) on which that table is maintained. In some embodiments, tables maintained by the service (and underlying system) under a committed throughput model may be maintained in faster (and often more expensive) storage resources, such as high performance media (e.g., flash memory or Solid State Drive, or SSD, media), in order to provide extremely low latencies when servicing requests from the client/user. For example, the system may provide (and dedicate) a high ratio of fast/local memory to main (e.g., disk) memory for the maintenance of those tables (and various partitions thereof). While the storage resources allocated to a given table under a committed throughput model may in some cases be underutilized (at least some of the time), the client/user may value the predictable performance afforded by the committed throughput model more than the additional (and in some cases wasted) costs of dedicating more resources than may always be necessary for that table. Similarly, resources that are pre-allocated to other types of services to support a committed work throughput model may in some cases be underutilized (at least some of the time), but may provide the client/user with a predictable level of performance (e.g., in terms of availability and/or responsiveness).

As described herein, in some embodiments the systems described herein may support both a multi-tenant model and a single-tenant model. In such some embodiments, the client/user may indicate a preferred one of these tenancy models for a particular table through a parameter of a request to create the table. In other embodiments, a client/user may specify a default or initial tenancy model for all tables created and maintained on their behalf by the data storage service.

Figure 4A:
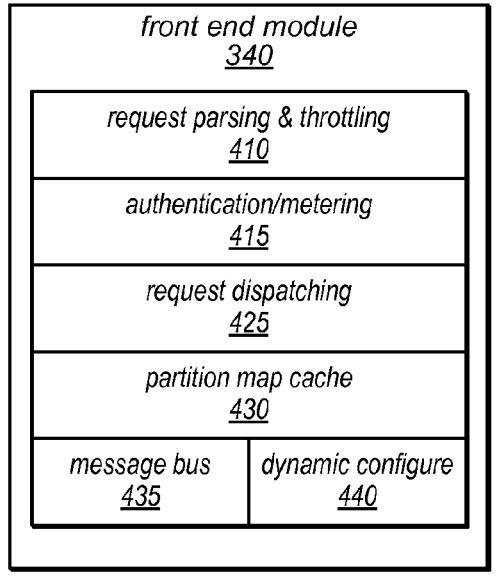
FIGS. 4A-4C are block diagrams illustrating various components of a Web services platform, according to one embodiment.
Figure 4B:
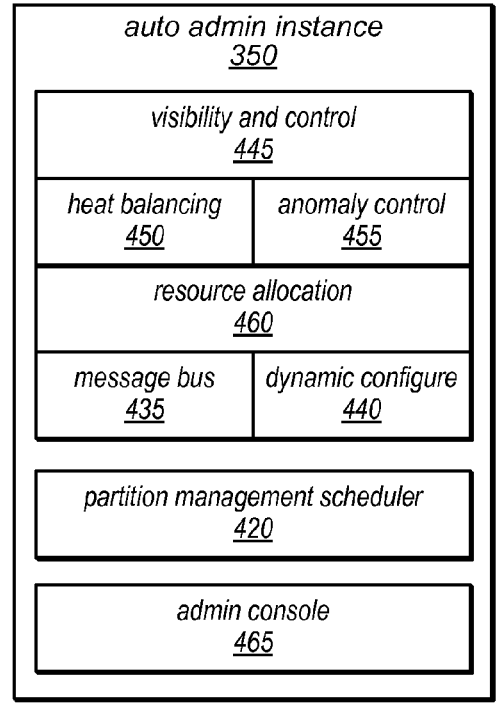
Figure 4C:
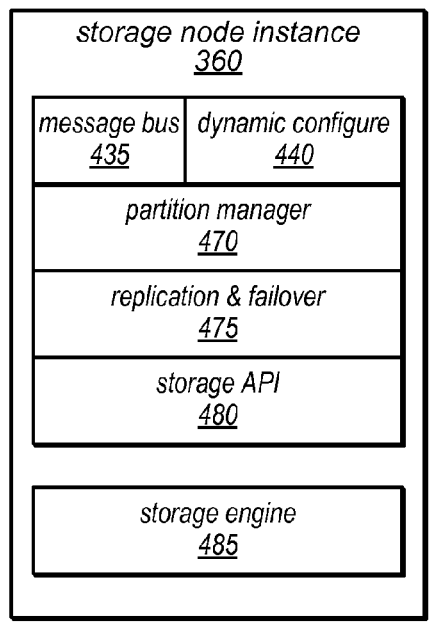

FIGS. 4A-4C illustrate various elements or modules that may be included in each of the types of components of Web services platform 330, according to one embodiment. As illustrated in FIG. 4A, front end module 340 may include one or more modules configured to perform parsing and/or throttling of service requests (shown as 410), authentication and/or metering of service requests (shown as 415), dispatching service requests (shown as 425), and/or maintaining a partition map cache (shown as 430). In addition to these component-specific modules, front end module 340 may include components that are common to multiple types of computing nodes that collectively implement Web services platform 330, such as a message bus (shown as 435) and/or a dynamic configuration module (shown as 440). In other embodiments, more, fewer, or different elements may be included in front end module 340, or any of the elements illustrated as being included in front end module 340 may be included in another component of Web services platform 330 or in a component configured to interact with Web services platform 330 to provide the data storage services described herein.

As illustrated in FIG. 4B, auto admin instance 350 may include one or more modules configured to provide visibility and control to system administrators (shown as 445), or to perform heat balancing (shown as 450), and/or anomaly control (shown as 455), resource allocation (shown as 460). In some embodiments, resource allocation module 460, heat balancing module 450, and/or anomaly control module 455 may be configured to work separately or in combination to perform selection, ordering, or scheduling of candidate partition management operations (e.g., various partition splitting operations or partition moving operations) and/or to select destination storage nodes (and/or particular storage devices/volumes) for those operations. In other embodiments, a central partition management scheduler module 420 (which may perform some or all of these partition management functions) may be included in auto admin instance 350, as illustrated in FIG. 4B. Auto admin instance 350 may also include an admin console 465, through which system administrators may interact with the data storage service (and/or the underlying system). In some embodiments, admin console 465 may be the primary point of visibility and control for the data storage service (e.g., for configuration or reconfiguration by system administrators). For example, admin console 465 may be implemented as a relatively thin client that provides display and control functionally to system administrators and/or other privileged users, and through which system status indicators, metadata, and/or operating parameters may be observed and/or updated. In addition to these component-specific modules, auto admin instance 350 may also include components that are common to the different types of computing nodes that collectively implement Web services platform 330, such as a message bus (shown as 435) and/or a dynamic configuration module (shown as 440). In other embodiments, more, fewer, or different elements may be included in auto admin instance 350, or any of the elements illustrated as being included in auto admin instance 350 may be included in another component of Web services platform 330 or in a component configured to interact with Web services platform 330 to provide the data storage services described herein.

As illustrated in FIG. 4C, storage node instance 360 may include one or more modules configured to provide partition management (shown as 470), to implement replication and failover processes (shown as 475), and/or to provide an application programming interface (API) to underlying storage (shown as 480). In some embodiments, the partition manager 470 (or another component of storage node instance 360) may be configured to identify candidate partition management operations to be performed locally (e.g., on a given storage node instance 360) based, e.g., on one or more measures of the utilization of provisioned (or reserved) resources on the storage devices or logical storage volumes of the storage node instance. For example, the partition manager may be configured to apply one or more resource utilization policies or partition management policies to make local decisions about which, if any, partitions or partition replicas stored on the local storage devices or logical storage volumes should be split or moved. Once the partition manager 470 (or another component of storage node instance 360) identifies one or more candidate partition management operations, information about the candidate partition management operations may be sent to an auto admin instance 350 (e.g., to a central partition management scheduler 420 of an auto admin instance 350), which may schedule the candidate partition management operations for execution based on a global prioritization across the distributed database system. In other embodiments, resource utilization information may be sent from each storage node instance 360 to an auto admin instance 350 (e.g., to a central partition management scheduler 420 of an auto admin instance 350), which may identify candidate partition management operations, and may schedule the candidate partition management operations for execution based on a global prioritization across the distributed database system.

In some embodiments, the partition manager 470 (or another component of storage node instance 360) may be configured to provide metadata about the storage node and/or its storage devices/volumes, recommendations of particular storage devices/volumes on which to place tables, partitions, and replicas, confirmation of resource reservations, or other information to the auto admin instance 350 that provides administrative functionality for the storage node instance 360. For example, in some embodiments, the partition manager 470 (or another component of storage node instance 360) may be configured to determine whether it can host a particular table, partition, or replica (e.g., based on the available storage and/or throughput capacity of the storage node instance), and/or to identify the particular storage devices/volumes on which a particular table, partition, or replica can be placed.

As illustrated in this example, each storage node instance 360 may include a storage engine 485, which may be configured to maintain (i.e. to store and manage) one or more tables (and associated table data) in storage 480 (which in some embodiments may be a non-relational database) on behalf of one or more clients/users. In addition to these component-specific modules, storage node instance 360 may include components that are common to the different types of computing nodes that collectively implement Web services platform 330, such as a message bus (shown as 435) and/or a dynamic configuration module (shown as 440). In other embodiments, more, fewer, or different elements may be included in storage node instance 360, or any of the elements illustrated as being included in storage node instance 360 may be included in another component of Web services platform 330 or in a component configured to interact with Web services platform 330 to provide the data storage services described herein.

Note that in some embodiments, it may not be necessary to perform some or all of the throttling, authentication, and/or metering operations that would typically be provided by front end module 340 in multi-tenant environments for tables operating in a single-tenant environment. For example, the system may be configured to elide these operations when servicing requests directed to tables in a single-tenant environment, but to perform them when servicing requests directed to tables in a multi-tenant environment. Similarly, in some embodiments, some of the operations illustrated as being performed by auto admin instance 350 (e.g., heat balancing and/or resource allocation) may or may not be applied in managing tables in a single-tenant environment. However, other operations illustrated as being performed by auto admin instance 350 (or various modules thereof) may be applied in the creation and/or management of tables in both multi-tenant and single-tenant environments.

Note that in various embodiments, the components illustrated in FIGS. 4A-4C may be implemented directly within computer hardware, as instructions directly or indirectly executable by computer hardware (e.g., a microprocessor or computer system), or as a combination of these techniques. For example, these components may be implemented by a distributed system including any number of computing nodes (or simply, nodes). In various embodiments, the functionality of a given component may be implemented by a particular node or distributed across several nodes. In some embodiments, a given node may implement the functionality of more than one of the component illustrated in FIGS. 4A-4C.

The systems underlying the data storage service described herein may store data on behalf of storage service clients (e.g., client applications, users, and/or subscribers) in tables containing items that have one or more attributes. In some embodiments, the data storage service may present clients/users with a data model in which each table maintained on behalf of a client/user contains one or more items, and each item includes a collection of attributes. The attributes of an item may be a collection of name-value pairs, in any order. In some embodiments, each attribute in an item may have a name, a type, and a value. Some attributes may be single valued, such that the attribute name is mapped to a single value, while others may be multi-value, such that the attribute name is mapped to two or more values. In some embodiments, the name of an attribute may always be a string, but its value may be a string, number, string set, or number set. The following are all examples of attributes: "ImageID"=1, "Title"="flower", "Tags"={"flower", "jasmine", "white"}, "Ratings"={3, 4, 2}. The items may be managed by assigning each item a primary key value (which may include one or more attribute values), and this primary key value may also be used to uniquely identify the item. In some embodiments, a large number of attributes may be defined across the items in a table, but each item may contain a sparse set of these attributes (with the particular attributes specified for one item being unrelated to the attributes of another item in the same table), and all of the attributes may be optional except for the primary key attribute(s). In other words, unlike in traditional databases, the tables maintained by the data storage service (and the underlying storage system) may have no pre-defined schema other than their reliance on the primary key. Note that in some embodiments, if an attribute is included in an item, its value cannot be null or empty (e.g., attribute names and values cannot be empty strings), and, and within a single item, the names of its attributes may be unique.

In some embodiments, the systems described herein may employ a somewhat limited indexing and/or query model in order to provide massive (i.e. virtually unlimited) scaling, predictability, and simplicity for users/subscribers or client applications. For example, in some embodiments, data may be indexed and partitioned (e.g., partitioned in the underlying database) by a primary key only. In such embodiments, the primary key to be used for indexing data in a user table may be specified by the user at the time that the table is created on the user's behalf. Thereafter, the partitioning of the user's data may be handled by the system, and abstracted from the user. In some embodiments, the primary key used for indexing data may consist of a single attribute hash key. In other embodiments, the primary key used for indexing and/or partitioning data may be a composite key comprising a hash key component and another component, sometimes referred to herein as a range key component. In various embodiments, queries may be supported against indexed attributes, and a full table scan function may be provided (e.g., to support troubleshooting). In some embodiments, users may define secondary indexes for a table based on one or more attributes other than those of the primary key, and then may query for items using the indexes they have defined. For example, in some embodiments the system may support the creation of creating secondary indexes on-the-fly (e.g., using a createIndex API), and these secondary indexes may scale automatically based on storage requirements (e.g., increasing or decreasing data volume) and/or read/write traffic. In some embodiments, such secondary indexes may be asynchronously updated as items in the table are updated.

In various embodiments, the service (and/or the underlying system) may enforce pre-determined size limits on table names, items, attribute values, primary key values, and/or attribute names. For example, in some embodiments, the total size of all the attribute names and values in an item (i.e. the row size) may be limited.

The database and data storage services described herein (and/or the underlying system) may provide an application programming interface (API) for requesting various operations targeting tables, items, and/or attributes maintained on behalf of storage service clients. In some embodiments, the service (and/or the underlying system) may provide both control plane APIs and data plane APIs. The control plane APIs provided by the data storage service (and/or the underlying system) may be used to manipulate table-level entities, such as tables and indexes and/or to re-configure various tables (e.g., in response to the findings presented in a skew report). These APIs may be called relatively infrequently (when compared to data plane APIs). In some embodiments, the control plane APIs provided by the service may be used to create tables, import tables, export tables, delete tables, explore tables (e.g., to generate various performance reports or skew reports), modify table configurations or operating parameter for tables (e.g., by modifying the amount of throughput capacity, adding storage capacity for additional read replicas, splitting partitions or moving partitions), and/or describe tables. In some embodiments, control plane APIs that perform updates to table-level entries may invoke asynchronous workflows to perform a requested operation. Methods that request "description" information (e.g., via a describeTables API) may simply return the current known state of the tables maintained by the service on behalf of a client/user. The data plane APIs provided by the data storage service (and/or the underlying system) may be used to perform item-level operations, such as storing, deleting, retrieving, and/or updating items and/or their attributes, or performing index-based search-type operations across multiple items in a table, such as queries and scans.

The APIs provided by the service described herein may support request and response parameters encoded in one or more industry-standard or proprietary data exchange formats, in different embodiments. For example, in various embodiments, requests and responses may adhere to a human-readable (e.g., text-based) data interchange standard, (e.g., JavaScript Object Notation, or JSON), or may be represented using a binary encoding (which, in some cases, may be more compact than a text-based representation). In various embodiments, the system may supply default values (e.g., system-wide, user-specific, or account-specific default values) for one or more of the input parameters of the APIs described herein.

As noted above, the control plane APIs supported by the service may include APIs that perform updates on tables (e.g., a CreateTable API and/or a DeleteTable API). In various embodiments, these APIs may invoke asynchronous workflows to perform the requested operation. In addition, the service may support methods that return the current known state (e.g., a DescribeTables API) or that return various skew metrics or reports (e.g., an ExploreTable API). In some embodiments, a common use model may be for a client to request an action (e.g., using a CreateTable API), and then to poll on its completion via the corresponding description API (e.g., DescribeTables). Other supported methods may be used to modify table configurations or parameters, e.g., an UpdateTable API (which may be used to increase the provisioned throughput capacity for a given table), a PurchaseTableCapacity API (which may be used to increase the provisioned storage capacity for a given table), a SplitTable API (which may be used to explicitly invoke an operation to split a table or any of its partitions), or a MoveTable API (which may be used to explicitly invoke an operation to move one or more tables, partitions of a table, or partition replicas of a table).

In some embodiments in which the system provides database or data storage services to clients, the system may provide an application programming interface (API) that includes support for some or all of the following operations on data maintained in a table by the service on behalf of a storage service client: put (or store) an item, get (or retrieve) one or more items having a specified primary key, delete an item, update the attributes in a single item, query for items using an index, and scan (e.g., list items) over the whole table, optionally filtering the items returned. For example, the data storage service (and/or underlying system) described herein may provide various data plane APIs for performing item-level operations, such as a PutItem API, a GetItem (or GetItems) API, a DeleteItem API, and/or an UpdateItem API, as well as one or more index-based seek/traversal operations across multiple items in a table, such as a Query API and/or a Scan API. Note that the amount of work required to satisfy service requests that specify these operations may vary depending on the particular operation specified and/or the amount of data that is accessed and/or transferred between the storage system and the client in order to satisfy the request.

In some embodiments, the system described herein may be configured to create and execute a database instance in a single-tenant environment on dedicated hardware (e.g., on a dedicated storage device) or on particular ones of the storage nodes in the system. In other embodiments, a database instance in a single-tenant environment may be created and may execute on a different virtual machine in a storage node than other database instances that are created and that execute on the same storage node. In some embodiments, the underlying software and/or hardware to implement the functionality for performing database operations that target tables in both types of environments (e.g., operations to store, retrieve, or delete data) may be the same (or substantially similar). However, since clients may be able to directly connect to database instances (and/or tables therein) in the single-tenant environment, there may not be a need for the system to provide an intermediate layer to provide security or other utilities required to support multi-tenancy. Instead, authentication checks may be skipped and clients may submit requests to perform operations on these tables directly to the underlying storage node(s), e.g., on a low-latency path.

In some embodiments, a client may submit a request to create a database instance (e.g., using a CreateDatabaseInstance API), and may submit a request for a description of a database instance (e.g., using a DescribeDatabaseInstance API), in response to which, the system may return a list of IP addresses at which the client may directly connect to the database instance (or a table therein) to perform various operations (e.g., create table, put item, get item, etc.). In general, a database instance in a multi-tenant environment may store tables for multiple different customers that all run within the same database instance. Therefore, the system may be required to keep clients from being able to access each other's tables using various security and authentication schemes. However, with a dedicated database instance in a single-tenant environment, the client may be given a specific IP address for the specific database instance, after which the client may configure a firewall group or another type of security group to limit the clients that are able to connect to that instance and/or create their own network connection to their table(s), e.g., a TCP connection that conforms to one of various open source protocols, in some embodiments.

In various embodiments, the systems described herein may be configured to allocate a variety of resources (which may include, for example, downstream services, database connections, input/output channels, computational resources, execution threads, a portion of system memory, disk memory or other persistent storage resources, or any other constrained resources) from one or more pools of resources to service requests received by the system in order to provide services requested by various clients. For example, in order to satisfy a service request directed to a data storage system, a data storage system may allocate one or more database connections, input/output channels, storage resource portions and/or other resources for each normalized, logical work unit or logical service request unit required to satisfy the request. In some embodiments, the systems described herein may include a Web service interface, an admission control subsystem for use in a multi-tenant environment, a service request subsystem for managing requests directed to tables in a multi-tenant environment, and a service request subsystem for managing requests directed to tables in a single-tenant environment. The Web services interface may be configured to receive requests for services from various clients and to communicate with the admission control subsystem to facilitate the performance of those services on behalf of the clients. For example, in some embodiments, the admission control subsystem may be configured to determine which and/or how many service requests that are directed to tables in a multi-tenant environment to accept from various clients, and may communicate with the appropriate service request subsystem to accept and/or service one or more received service requests. In some embodiments, the maximum request rate may be dynamically adjusted dependent on the current work throughput rate and/or a target or committed work throughput rate. In other embodiments, service requests may be managed using work-based tokens. If a service request is accepted for servicing by the admission control subsystem, the appropriate service request subsystem may in turn be configured to allocate (or initiate allocation of) one or more resources needed to perform the requested services to those requests, and/or to return results to the client via the Web services interface.

Various techniques that may be implemented by a Web server (or various components thereof) are described in more detail below, according to different embodiments. In general, any or all of the techniques described herein for managing the processing of service requests on behalf of clients and/or the management of tables, partitions, and replicas may be performed by and/or implemented in a module that is a component of a Web server. While several examples described herein are directed to systems that provide services over the Internet, in other embodiments, these techniques may be performed by and/or implemented by various components of another type of system that provides services to clients, and that is configured to receive, accept, and/or service requests on behalf of those clients.

Figure 5:
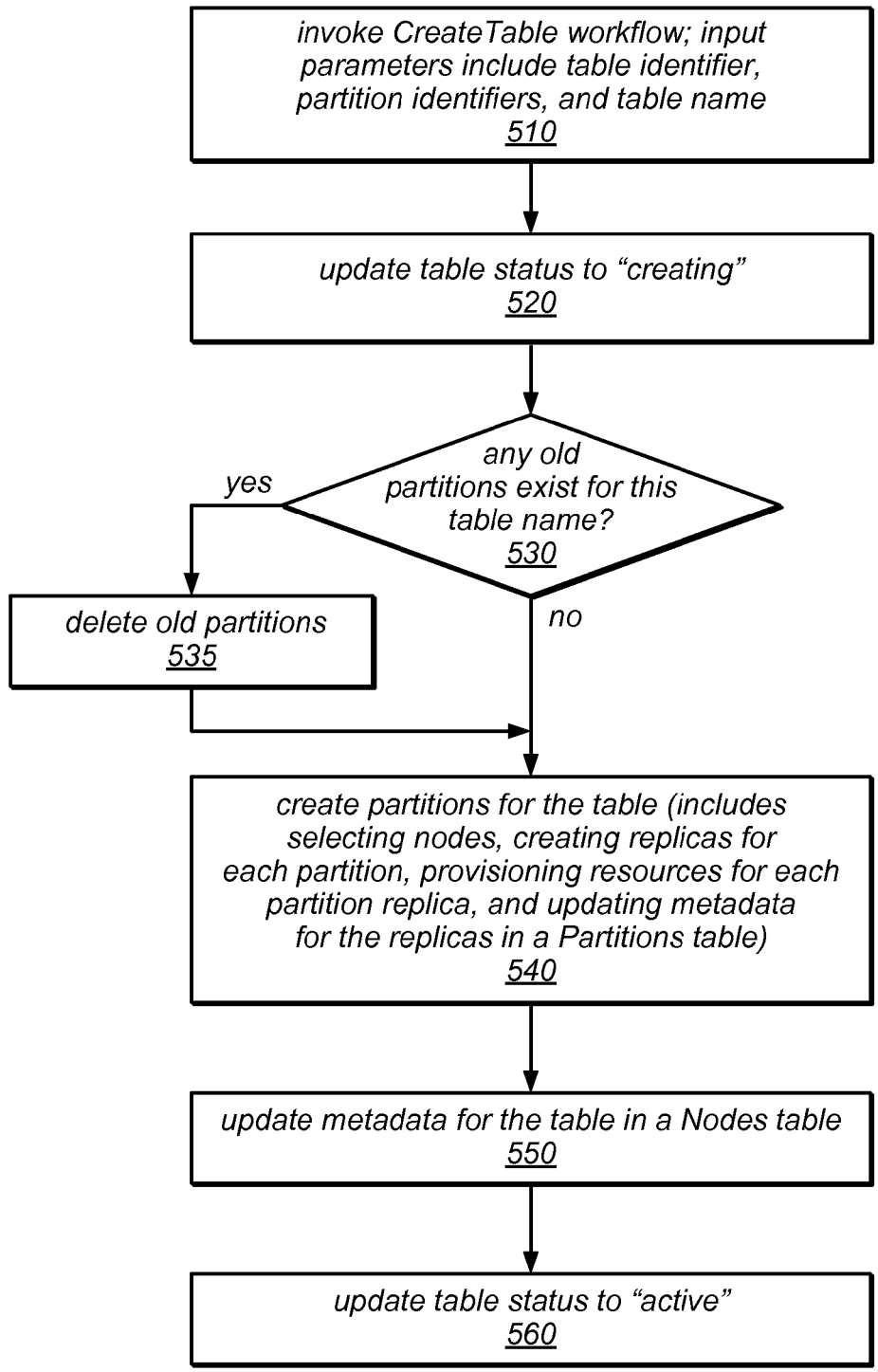
FIG. 5 is a flow diagram illustrating one embodiment of a workflow for creating a table.

As previously noted, a system that is configured to implement the data storage service described herein may rely on one or more workflows that are executed using an external workflow service. FIG. 5 illustrates one embodiment of such a workflow for creating a table. As illustrated at 510, the method may include invoking the CreateTable Workflow (e.g., in response to a request to create a table and subsequent to generating metadata for the new table). As illustrated in this example, in some embodiments, the table name, table identifier, and/or partition identifiers may all be passed to the CreateTable workflow as inputs to that process. Note that this (and/or any other service requests described herein) may include an input parameter identifying a particular subscriber, such as an accountID parameter. In such embodiments, the value of this input parameter may be passed to any workflows invoked in response to receiving the service request (e.g., the CreateTable workflow).

In some embodiments, a CreateTable workflow may allocate one or more partitions for a new table, create two or more replicas each for the partitions, and update the appropriate metadata in response to creating the table. One embodiment of such a workflow is illustrated by the flow diagram in FIG. 5. The workflow may be intended to be self-healing, in some embodiments. In such embodiments, if the process fails before completion, the whole workflow may be rerun one or more times until it succeeds. For example, each of the operations illustrated in FIG. 5 may be retried again and again in response to a failure. Note that in this example, it is assumed that the workflow is invoked only after determining that no active table exists that has the specified table name.

As illustrated in this example, the workflow may include updating the status of the table to "Creating" to reflect the fact that a workflow is currently working to create the table, as in 520. In some embodiments, the table status may be atomically updated to "Creating". In such embodiments, if multiple workflows attempt to perform this same table creation operation, only one will succeed, thus allowing the system to avoid a race condition, in this case. The workflow may also include determining whether any old partitions exist that include the table name specified for the new table, as in 530. For example, if a creation operation specifying this table name has been attempted (and failed) in the past, there may be remnant partitions remaining in the system that should be deleted before proceeding with the rest of the CreateTable workflow. In some embodiments, the workflow may include querying metadata (e.g., the Tables table) for any partitions associated with this table name. For example, there may be remnants of a previous failed attempt to create a table with this table name in the system, including metadata for the table in one or more metadata tables. For each partition found, there may be multiple replicas, and each of these replicas may be physically deleted from the storage nodes on which they reside, as in 535.

If no partitions associated with the specified table name are found (e.g., if this table creation operation has not been previously attempted and failed), shown as the negative exit from 530, or once such remnants have been deleted, the workflow may create one or more partitions for the new table, as in 540. As previously described, in some embodiments, the number of partitions created may be based on user input, historical data, and/or system-wide, client-specific, or application-specific defaults. As illustrated in FIG. 5, creating partitions for the new table may include selecting nodes on which to store multiple replicas of each of the partitions, creating the multiple replicas (which may include provisioning storage resource capacity and/or throughput capacity for each replica of each of the partitions), and updating the partition metadata (e.g., updating a "Partitions table" to include the newly created replicas and to indicate their locations). In some embodiments, selecting the nodes on which to store the replicas may include querying metadata to discover healthy nodes on which replicas can be stored, and allocating replicas to various ones of the healthy nodes using any of a variety of suitable allocation algorithms. In some embodiments, the system may support two or more flexible and/or pluggable allocation algorithms, including, but not limited to, selecting the nodes that have the most available storage space, selecting the nodes experiencing the lightest workload (e.g., the nodes receiving the fewest service requests), or selecting nodes at random (which may minimize a herding effect in which all new partitions go to the most lightly loaded nodes). Note that various methods for selecting the nodes on which replicas can be are described in more detail below, according to different embodiments.

As illustrated in FIG. 5, the CreateTable workflow may include updating node related metadata for the newly created table (e.g., in a "Nodes table"), as in 550. For example, the workflow may include reading all of the node locations of the newly created replicas from the Partitions table (which was updated in 540), and adding each of the newly created replicas to the appropriate entries of the Nodes table. Once the table's partitions (and their replicas) have been created, and the appropriate metadata has been updated to reflect the creation of the new table, the workflow may include updating the status of the newly created table to "Active", as in 560. In some embodiments, updating the status of the newly created table to "Active" may include decrementing a count of the number of tables that are in the "Creating" state in the Subscribers table described above.

Figure 6:
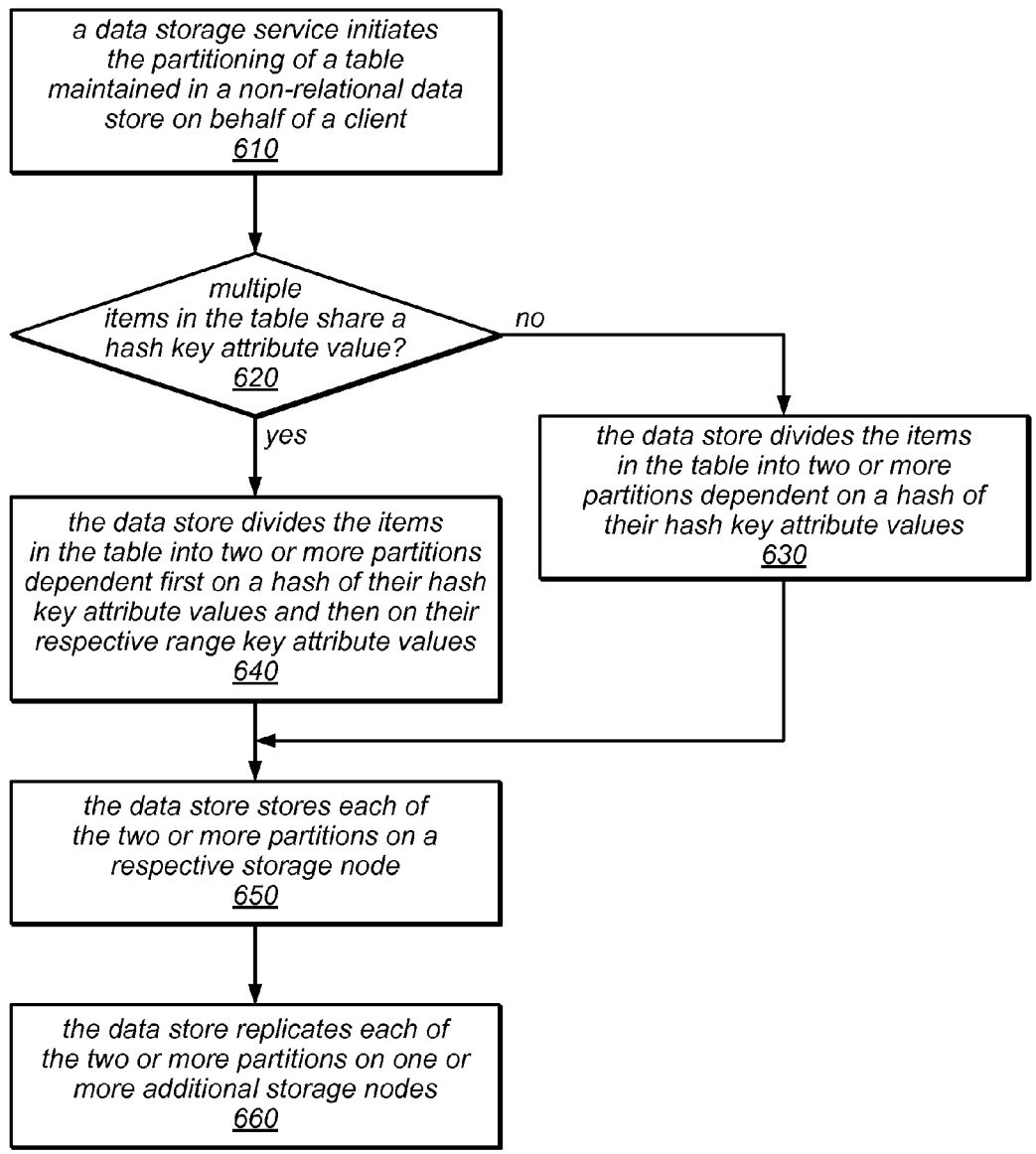
FIG. 6 is a flow diagram illustrating one embodiment of a method for partitioning a table maintained in a non-relational data store.

As previously noted, in embodiments in which the primary key is a simple key, the item in a table being maintained on behalf of a storage service client may partitioned using a hash of the primary key value of each of the items, while in embodiments in which the primary key is a composite key, the data may be partitioned first by a hash of the hash key component, and then by the range key component. FIG. 6 illustrates one embodiment of a method for partitioning table data using simple and/or composite keys, according to one embodiment. As illustrated at 610, in this example, the method may include a data storage service (or a component of the underlying system that implements a data store, such as a storage node instance or administrative component) initiating the partitioning of a table maintained in a non-relational data store on behalf of a storage service client.

If multiple items in the table share a hash key attribute value, shown as the positive exit from 620, the method may include the data store dividing the items in the table that have a given hash key attribute value into two or more partitions (e.g., database partitions) dependent first on a hash of their range key attribute values, and then on their range key attribute values, as in 640. In other words, if the primary key for the table is a composite key that includes hash key component whose values may be used to identify a group of items and a range key component whose values may be used to order items having the same hash key attribute values and uniquely identify each of those items, both the hash key attribute value and the range key attribute value may be used to partition the items in the table. For example, for a group of items that have the same hash key attribute value, the first n items in the group (when ordered by their respective range key attribute values) may be assigned to one partition, the next m items in the group may be assigned to a second partition, and so on. Note that in some embodiments, each partition may include a portion of the items sharing one hash key attribute value and may also include other items having other hash key attribute values.

If none of the items in the table share a hash key attribute value, shown as the negative exit from 620, the method may include the data store dividing the items in the table into two or more partitions dependent on a hash of their respective hash key attribute values, as in 630. For example, if the primary key for the table is a simple key that includes hash key component whose values may be used to uniquely identify each of the items in the table, the items in the table may be partitioned (i.e. assigned to one of a plurality of partitions) dependent a hash of the hash key attribute value, but not dependent on any other item attribute values. In some embodiments, if the primary key is a composite key, but none of the items in the table share a hash key attribute value (i.e. if each item has a unique hash key attribute value), the data store may partition the items as if the primary key were a simple key (i.e. it may partition the items in the table using the hash key attribute value alone).

Once the data store has assigned all of the items to a partition, the data store may store each of the partitions on a respective storage node (e.g., a respective computing node or storage device), as in 650, which may include provisioning storage resource capacity and/or throughput capacity for each of the partitions on their respective storage nodes. In some embodiments, each partition of a single table may be stored on a different storage node, while in other embodiments two or more of the partitions may be maintained on the same storage node. Note that various methods for selecting the nodes on which the partitions are stored are described in more detail below, according to different embodiments.

In various embodiments, each of the resulting partitions may be replicated one or more times in the data storage system, as in 660, which may include provisioning storage resource capacity and/or throughput capacity for each of the replicas on respective storage nodes. Various methods for selecting the node on which each of the partition replicas is stored are described in more detail below, according to different embodiments. Note that in some embodiments, the number of partitions into which the items of a given table are partitioned may be pre-determined (e.g., it may be based on user input/preferences, or historical data for a client, account, or table type), while in other embodiments, the number of partitions into which the items of a given table are partitioned may be determined as the partitioning operation progresses, e.g., based on the number of items in each range of hash results and/or the number of items in each range of range key attribute values. Note also that because the partitioning is based on a hash result, the order in which groups of items may be assigned and distributed among the available partitions may be somewhat randomized. In some cases, e.g., if some items are accessed much more frequently than others or some groups of items include a higher number of items than others, an initial partitioning may result in hot spots. In such cases, a partition management operation (e.g., a partitioning splitting operation or a partition moving operation) may be performed in order to more evenly distribute the items among the available partitions (e.g., with respect to data volume and/or service request traffic). Note also that in some embodiments, the items in a table may be partitioned using a single hash key component and two or more range key components.

In one example of the partitioning of items in a given table, the hash key attribute is a "User name" attribute, and the range key attribute is a "Message ID" attribute. In this example, the given table stores multiple messages associated with each of three user names (Bob, Sue, and Phil). In this example, some partitions of the given table may include only items having the same hash key attribute value. In this example, a partition identified by a Partition ID value of A may store only messages having the hash key attribute value "Bob". Note that this partition may not store all of Bob's messages, but only messages having Message ID values (i.e. range key attribute values) 1-199. Another group of Bob's messages (those with range key attribute values 200-299) may be stored in a partition identified by a Partition ID value of B. This partition may also store messages having a hash key attribute value of "Sue", specifically, those messages having range key values of 1-50. Yet another group of Bob's messages (those with range key attribute values 300-399) may be stored in a partition identified by a Partition ID value of C. This partition may also store messages having a hash key attribute value of "Phil", specifically, those messages having range key values of 1-100.

In this example, a request to retrieve all of Bob's messages may retrieve messages 1-199 from partition A (which may be maintained on a particular storage node), messages 200-299 from partition B (which may be maintained on a different storage node), and messages 300-399 from partition C (which may be maintained on yet another storage node). In some embodiments, a request to retrieve all of these messages may be terminated early (e.g., if response limit is reached), and the remaining messages may be retrieved in response to a subsequent request.

As previously noted, in some embodiments, the data storage service (and/or underlying system) described herein may provide two different APIs for searching the data maintain in tables on behalf of storage service clients: a Scan API and a Query API. In some embodiments, the Scan API may be used to request an operation that scans an entire table. A Scan request may specify one or more filters to be applied to the results of the scan operation, e.g., to refine the values returned to the requestor following the complete scan. In some embodiments, the Query API may support comparison operations to limit the search process to the data that matches the supplied query conditions (e.g., conditions on the attributes of the items). For example, a Query request may be used to find all the data in a table that matches the parameters specified in the request, up to a pre-defined limit (if such a limit is imposed by the system).

In various embodiments, a Scan API may be used to retrieve one or more items and attributes stored in a table on behalf of a storage service client by performing a full scan across the table. The items returned may be limited by specifying a filter. In some embodiments, the Scan API may support richer semantics than the Query API described above. For example, it may support comparison operators such as "CONTAINS", "IS NULL", "IN", etc.

In some embodiments, any or all of the metadata described herein as being used in maintaining and managing tables on behalf of a data storage service client (including any metadata tables described herein) may be stored in the same scalable data store (e.g., the same non-relational database) as that in which the client/user tables are stored. For example, various computing nodes may store user data (e.g., in tables maintained on behalf of a user) and/or system data, including metadata used by the data storage service, such as that described above. Therefore, each node of the data model for such a system may include an indicator of the type of the node. For example, in one embodiment, each node may be designated as a "storage node", a "request router", an "auto-admin" node, or a "staging" node. In some embodiments, a "storage node" may store user data in one or more tables maintained by the data storage service, but metadata (e.g., data stored in one or more of a Tables Table, a Subscribers Table, a Partitions Table, or a Nodes Table) may be hosted on other types of nodes (e.g., "auto admin" nodes and/or "staging" nodes). In other embodiments, such metadata may be stored on one or more "storage nodes", some of which may also store user data. Each node may also include an identifier of the node, and one or more other elements. In some embodiments, information about each replica may be represented in the data model, and each replica in the data model may include an identifier of the node on which the replica is hosted, and one or more partition identifiers indicating the partitions included in those replicas. For example, each partition may be represented in the data model as a partition element, which may include its partition-id. In various embodiments, each node may host multiple replicas, and each partition may be included in multiple replicas.

In various embodiments, there may be situations in which a partition (or a replica thereof) may need to be copied, e.g., from one machine to another. For example, if there are three replicas of a particular partition, each hosted on a different physical or logical machine, and one of the machines fails, the replica hosted on that machine may need to be replaced by a new copy (replica) of the partition on another machine. In another example, if a particular machine that hosts various replicas of multiple partitions of one or more tables experiences heavy traffic, one of the heavily accessed partition replicas may be moved (e.g., using a copy operation followed by an operation to redirect traffic) to a machine that is experiencing less traffic in an attempt to more evenly distribute the system workload and improve performance. In some embodiments, the data storage service (and/or underlying system) described herein may perform replica moves and/or replica copying using a physical copying mechanism (e.g., a physical file system mechanism) that copies an entire partition replica from one machine to another, rather than copying a snapshot of the partition data row by row (as in a traditional logical database partition copying operation).

As described in more detail herein, in some embodiments, all write operations may be logged before being applied to a particular partition (and/or various replicas thereof), and they may be applied to the partition (i.e. to the replicas thereof) periodically (e.g., in batches). In such embodiments, while a partition replica is being copied, write operations targeting the partition may be logged. During the copy operation, these logged write operations may be applied to the partition at periodic intervals (e.g., at a series of checkpoints). Once the entire partition has been copied to the destination machine, any remaining logged write operations (e.g., any write operations performed since the last checkpoint, or any write operations that target portions of the partition that were copied to the destination prior to those write operations being logged) may be performed on the destination partition replica by a final catch-up process. In some embodiments, the catch-up process may examine the sequentially ordered write operations in the log to determine which write operations have already been applied to the destination partition replica and which, if any, should be applied to the destination partition replica once the physical copying of the partition data is complete. In such embodiments, unlike with traditional partition copying or moving mechanisms, the data in the destination partition replica may be consistent following the completion of the operation to move/copy the partition replica.

Figure 7:
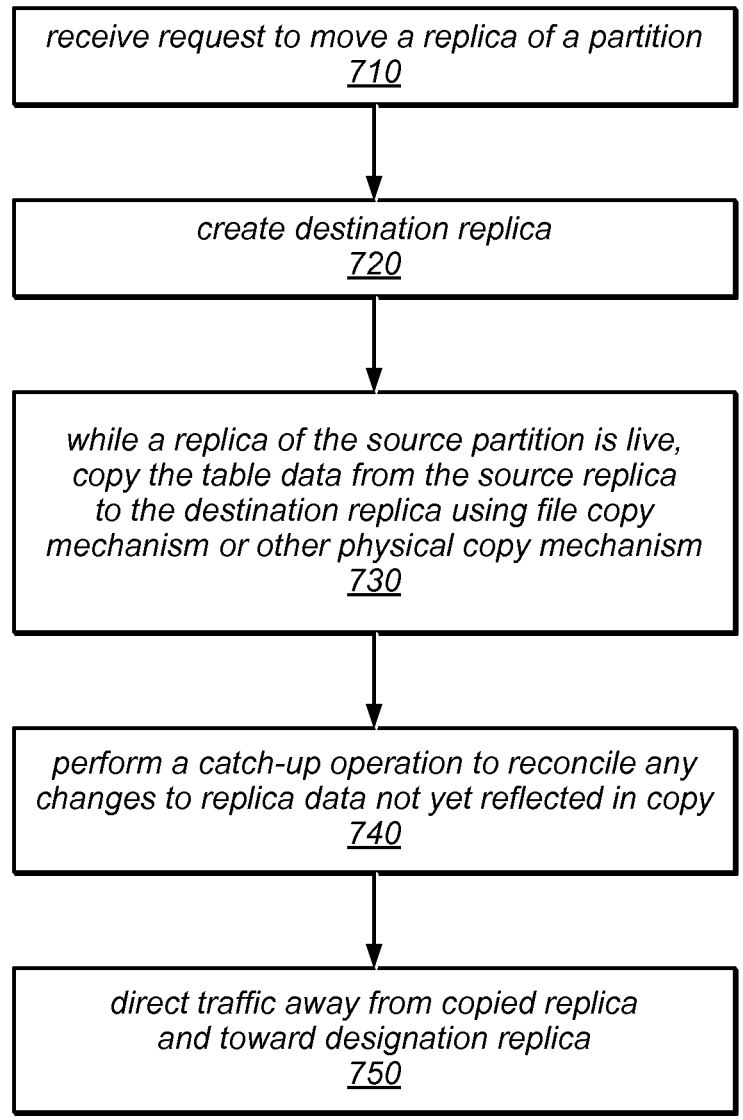
FIG. 7 is a flow diagram illustrating one embodiment of a method for moving a replica of a partition of a table being maintained by a data storage service on behalf of a storage service client while the partition is "live".

One embodiment of a method for moving (or copying) a replica of a partition of a table being maintained by a data storage service on behalf of a storage service client while the partition is "live" is illustrated by the flow diagram in FIG. 7. In this example, the method may include a component of the system that implements the data storage service receiving a request to move a replica of a partition, as in 710. For example, the system may receive an explicit request to move a replica from a client/user or system administrator, or such a request may be automatically generated in the system in response to detecting an anomaly (as described in more detail herein). As illustrated at 720, in response to receiving the request to move the partition, the system may be configured to create a new replica (which may be referred to as a destination replica), while the partition is live (i.e. while one or more replicas of the partition continue to accept and service requests directed to the partition). In some embodiments, creating a destination replica may include selecting a computing node or storage device on which to create the destination replica, allocating memory on the computing node or storage device for the destination replica, creating or updating metadata associated with the partition and/or the destination replica, and/or performing other functions appropriate for creating the destination replica. Note that various methods for selecting the nodes on which to create the destination replicas are described in more detail below, according to different embodiments.

As illustrated in this example, the method may include the system copying table data from the replica being moved (or from another source replica storing the same table data as the replica being moved) to the destination replica using a file copy mechanism or another physical copy mechanism while one or more replicas of the partition are live, as in 730. In other words, the replica may be copied to the new destination replica using an operation that copies the physical locations of the replica data, rather than using a logical copying operation (e.g., one that reads and copies table data on a row-by-row basis).

As illustrated at 740, after performing the physical copying operation, the method may include the system performing a catch-up operation to reconcile any changes to the replica data that were made during the copy operation but that are not yet reflected in the new copy. This catch-up operation is described in more detail below. Once the destination replica has been created and populated, the method may include directing traffic away from copied replica and toward the new designation replica, as in 750. For example, the system may configure the new destination replica to receive and service requests targeting table data that was maintained on the particular partition replica and some or all service requests targeting the partition may be directed away from the source replica and toward the new destination replica.

Note that in some embodiments, information about a requested move operation may be added to database table, list, or other data structure that stores information about candidate partition management operations prior to the requested move operation being scheduled for execution. In such embodiments, a central partition management scheduler may be configured to schedule the requested move operation for execution according to a global prioritization scheme and in light of other pending partition management operations for which information is stored in the database table, list, or other data structure (e.g., other partition management operations requested by a client/user or system administrator, partition management operations initiated by the system in response to detecting an anomaly in the system, and/or candidate partition management operations that were identified by various storage nodes), as described herein.

In some embodiments, the storage engine for the underlying data store of a data storage service (e.g. a non-relational database) may store replica data in database files, and each replica (and database file) may be associated with a recovery log. In such embodiments, when a service request to modify the replica data is received, it may be logged in the recovery log before being applied to the replica. In the case of a node failure or system crash, the changes logged in the recovery log may be reapplied to a previous snapshot or checkpoint of the replica data to recover the contents of the replica. As noted above, in some embodiments, the data storage service (and its underlying system) may support a replica move operation and/or a replica copying operation that employs a physical copy mechanism. In some such embodiments, the physical copy mechanism may employ such a log, which may ensure that the replica data that is moved to a new destination is consistent.

In some embodiments, the replica copying process described above may be employed in partition splitting operations. For example, a partition may be split because it is large (e.g., because it is becoming too big to fit on one machine) and/or in order to keep the partition size small enough to quickly rebuild the partitions hosted on a single machine (using a large number of parallel processes) in the event of a machine failure. A partition may also be split when it becomes too "hot" (i.e. when it experiences a much greater than average amount of traffic as compared to other partitions). For example, if the workload changes suddenly and/or dramatically for a given partition, the system may be configured to react quickly to the change. In some embodiments, the partition splitting process described herein may be transparent to applications and clients/users, which may allow the data storage service to be scaled automatically (i.e. without requiring client/user intervention or initiation).

Note that in some embodiments, moving (or copying) a replica of a partition in a cluster may be quicker than splitting a partition, because the system may take advantage of the file copying process described above for replica copying. Splitting a partition, on the other hand, may require logically dividing the partition data in one underlying data structure (e.g., one B-tree) into two such data structures (e.g., two B-trees), which is generally less efficient than moving an entire replica, as described above. Therefore, in some embodiments, a partition splitting process may include creating additional replicas of the partition, and thereafter managing only a portion of the partition data on each replica. For example, if there are three replicas of a given partition that is to be split, the partition splitting process may include creating three additional copies of the entire partition (e.g., using the partition copying process described above). These resulting six replicas may be split into two new replica groups of three replicas, each of which may be configured to be responsible for handling service requests directed to half of the original partition data by invoking an operation to split the responsibilities between the replica groups. For example, following the operation to split the responsibilities, service requests directed to data in a designated portion of the original partition may be accepted and serviced by replicas of a given replica group, while service requests targeting the remaining data of the original partition may be rejected by that replica. In some embodiments, the partition data for which a given replica is not responsible may eventually be removed (e.g., so that the memory allocated to the replica for data it no longer supports may be subsequently used to store new items in the replica), or the memory in which it was stored may be reclaimed by the system (e.g., so that the memory allocated to the replica for data it no longer supports may be subsequently used by another partition). Removal of unsupported data or reclamation of memory may be performed by background tasks without affecting the performance of the data storage system, and may be transparent to clients/users.

In some embodiments, each partition may be identified by a partition ID, which may be a unique number (e.g., a GUID) assigned at the time the partition is created. A partition may also have a version number that is incremented each time the partition goes through a reconfiguration (e.g., in response to adding or removing replicas, but not necessarily in response to a master failover). When a partition is split, two or more new partitions may be created, each of which may have a respective new partition ID, and the original partition ID may no longer be used. In some embodiments, a partition may be split by the system using a split tool or process in response to changing conditions. For example, a scheduled task of an auto admin instance may monitor partition sizes and "heat" (e.g., traffic directed to each partition), and may apply policies that determine when to use the splitting tool/process to perform a split. In some embodiments, the splitting tool and auto admin instance may avoid attempting two splits at the same time by employing a lock manager.

In some embodiments, the monitoring component may provide a list of partitions that meet the split criteria to the splitting tool/process. In other embodiments, one or more lists of candidate split operations (and/or move operations) may be provided by various ones of the storage nodes in response to a query or when the storage nodes detect a trigger condition for a partition splitting operation or a partition moving operation. The criteria may be based on partition size and heat, where heat may be tracked by internally measured metrics (such as IOPS), externally measured metrics (such as latency), and/or other factors. In some embodiments, the splitting tool/process may receive a request to split a partition from the monitoring component that includes a partition ID and a version number for the partition to split, and a list of machines (e.g., machines in the same cluster or storage silo that are known to be lightly loaded) for the location(s) of the new partitions/replicas. Including the version number as an input to the splitting tool/process may ensure that the splitting tool/process does not attempt to split a partition that has already gone through one or more reconfigurations since the last time it was evaluated against the split criteria, as the splitting tool/process may reject the request if version number does not match.

Figure 8:
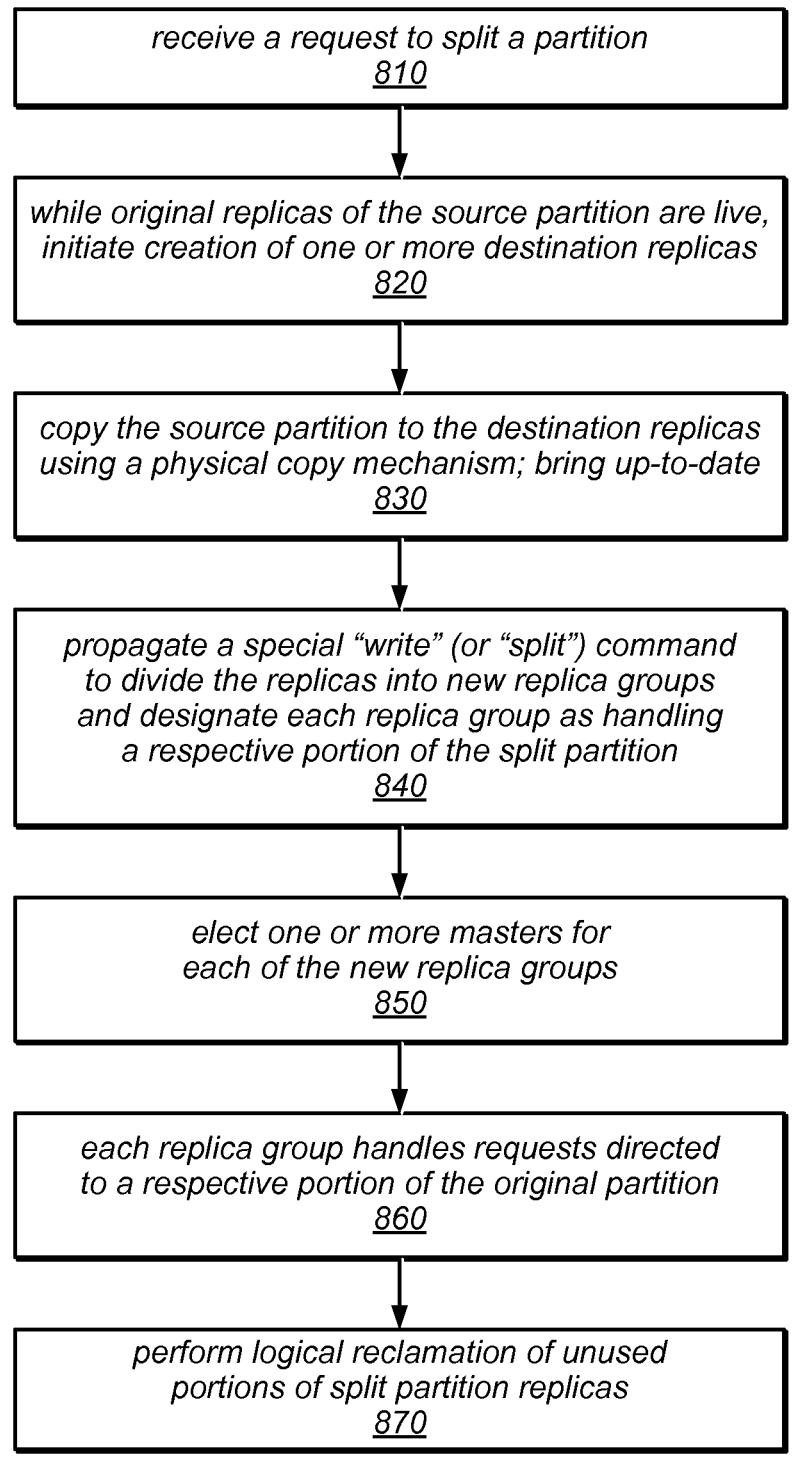
FIG. 8 is a flow diagram illustrating one embodiment of a method for splitting a partition of a table being maintained by a data storage service in response to a request to do so.

One embodiment of a method for splitting a partition of a table being maintained by a data storage service on behalf of a storage service client is illustrated by the flow diagram in FIG. 8. In this example, the method may include a component of the system that implements the data storage service receiving a request to split a partition, as in 810. For example, the system may receive an explicit request to split the partition from a client/user or system administrator, or such a request may be automatically generated in the system in response to detecting an anomaly (as described in more detail herein). As described above, in some embodiments, splitting a partition may involve creating additional replicas of the partition, dividing the resulting collection of partition replicas into two or more new replica groups, and then designating each of the replica groups as managers of a respective portion of the original partition. Therefore, as illustrated at 820, in response to receiving the request to split the partition, the system may be configured to initiate creation of the one or more new partition replicas (which may be referred to as destination replicas), while one or more of the original replicas of the source partition are live (i.e. while one or more of these replicas continue to accept and service requests directed to the partition). Note that various methods for selecting the nodes on which to create the destination replicas are described in more detail below, according to different embodiments.

As illustrated at 830, the method may include copying data from one or more source partition replicas to the destination replicas using a physical copy mechanism (such as that described above). For example, the system may be configured to copy the table partition data from one (or more) of the original replicas of the partition to one or more of the destination replicas using a file copy mechanism, in some embodiments. The method may also include bringing the new replicas (once populated) up-to-date (e.g., by performing a catch-up operation, as described above).

As illustrated in this example, the method may include propagating a special "write" command (i.e. a "split" command) to split the partition by dividing the resulting collection of replicas into two or more new replica groups and designating (and/or configuring) each replica group as handling service requests directed to a respective portion of the split partition, as in 840. In some embodiments, the system may take the source replicas out of use briefly while the command to split the partition replicas is propagated to the storage nodes on which the resulting collection of replicas are hosted. In other words, the system may not accept other service requests directed to the partition being split while the split command is operating to configure the new replica groups to receive subsequent service requests. In an example in which a partition is being split into two new partitions, the split command may instruct the replicas resulting from the copy operation to split in half by designating each replica as belonging to the first half of the range or the second half of the range, thus forming two new replica groups. In other embodiments, the split command may designate each replica as belonging to one of more than two replica groups. Note that in some embodiments, the special "split" command may not require any special durability, while in others it may require the same durability as any other replicated write operation, or may have a different durability requirement than other replicated write operations.

As illustrated in this example, once the "split" command has been propagated and the new replica groups have been established, if the system is a single master system or a multi-master system, the method may include each of the new replica groups electing one or more masters for the replica group, as in 850. Subsequently, the replicas in each of the new replica groups for the split partition (e.g., a replica group made up of the original replicas, a replica group made up of the destination replicas, or a replica group made up of any other subset of the resulting replicas for the split partition) may handle requests directed to a respective portion of the original partition, as in 860. For example, each of the replicas may reject requests for the table data that is now out of its new smaller range, and may return an indication that the replica (or the node on which the replica is hosted) no longer hosts that data. As described above, in some embodiments, the system may be configured to perform a logical reclamation of the unused portions of the resulting split partition replicas, as in 870. For example, as requests to store new items in the partition are received, these new items may be stored in locations in the table that (following the replica copying operation) held items stored in the original partition, but that are now being managed as part of a different partition (i.e. one of the two or more new partitions created by the split). In some embodiments, the system may employ a background process to logically free up space within each of the resulting partition replicas, but that space may be consumed later if more items are added to the table that are assigned to the new partition replicas according to their hash key attribute values and/or range key attribute values. In some embodiments, a physical memory reclamation operation may be performed, which may return a portion of the memory that was previously allocated to a large partition replica prior to the split to the operating system. In such embodiments, a de-fragmentation operation may also be performed.

Note that in some embodiments, information about a requested split operation may be added to database table, list, or other data structure that stores information about candidate partition management operations prior to the requested split operation being scheduled for execution. In such embodiments, a central partition management scheduler may be configured to schedule the requested split operation for execution according to a global prioritization scheme and in light of other pending partition management operations for which information is stored in the database table, list, or other data structure (e.g., other partition management operations requested by a client/user or system administrator, partition management operations initiated by the system in response to detecting an anomaly in the system, and/or candidate partition management operations that were identified by various storage nodes), as described herein.

As noted above, the partition moving process described above and illustrated in FIG. 7, and the partition splitting process illustrated in FIG. 8 and described above may be initiated automatically (e.g., programmatically) in response to detection of an anomaly in a system that implements a data storage service, in some embodiments. For example, if a hot spot develops on a particular computing node or storage device in the system underlying the data storage service, the system may be configured to split a hot partition for which a replica is stored on that computing node or storage device and/or move one or more partition replicas stored on that computing node or storage device to another computing node or storage device.

In some embodiments, the data storage service (and/or underlying system) may be configured to detect anomalies in the system while servicing requests from one or more storage service clients. In some embodiments, the system may be configured to automatically (e.g., programmatically) respond to the detection of various types of anomalies, such as by scaling tables, moving partitions, splitting partitions, and/or taking other actions not described herein. For example, if a failed or faulty node (e.g., a computing node or storage device) has been detected, the system may be configured to replace the failed or faulty node with a new node and/or to move any or all partitions that are hosted on the failed or faulty node to the new node. As described herein, such a move may in some embodiments be performed using a physical copy operation. As previously noted, if a failed or faulty node hosted a partition replica that was a master for its replica group, the system may also be configured to elect a new master for the replica group subsequent to copying the partition to the new node.

If a hot spot or increasing table/partition size is detected, the system may be configured to add one or more new partitions and corresponding replicas (e.g., on computing nodes or storage devices other than the one on which the hot spot was detected), and to move and/or split data that was hosted on the heavily loaded computing node or storage device in one or more of the new partitions or replicas. Similarly, if the system has detected that a best effort throughput target (or another user preference) is not being met or is in danger of not being met due to increasing traffic or if the data volume is increasing beyond a targeted capacity for the table, the system may be configured to throttle incoming service requests while attempting to correct the situation. Again, the system may be configured to add one or more new partitions and corresponding replicas (e.g., on computing nodes or storage devices other than the one on which the hot spot was detected), and to move and/or split data that was hosted on the heavily loaded computing node or storage device in one or more of the new partitions or replicas. Similarly, if a live repartitioning operation (e.g., a partition splitting operation or a partition moving operation) is explicitly requested (e.g., by a table owner), the system may be configured to add or remove one or more partitions and corresponding replicas accordingly, or to move and/or split data that was hosted on a heavily loaded computing node or storage device in one or more partitions or replicas. In any of these scenarios, the destination storage nodes for new, split, or relocated partitions or replicas may be selected using any of a variety of different resource allocation techniques, including those illustrated in FIGS. 1 and 9-15 and described herein.

In general, once an anomaly has been detected and the system has responded to and/or returned an indicator of that anomaly, the system may resume (or continue) servicing incoming requests. In some embodiments, the system may be configured to continue operation (e.g., to continue servicing incoming service requests) until or unless additional anomalies are detected. If any additional anomalies are detected, any or all of the operations described above for resolving such anomalies may be repeated by the system in order to maintain and manage tables on behalf of data storage service clients. Note that in some embodiments, any or all of the operations described above for resolving such anomalies may be performed pro-actively (and automatically) by background tasks while the data storage service is in operation, and may not necessarily be performed in response to receiving any particular service requests.

As previously noted, the systems described herein may provide storage services to clients, and may maintain data on behalf of clients in partitions that are replicated on multiple storage nodes. In some embodiments, these storage systems may implement a single master failover protocol. In some embodiments, membership in various replica groups may be adjusted through replicated changes, and membership and other updates in the system may be synchronized by synchronizing over a quorum of replicas in one or more data centers at failover time using a replicated quorum version. In some embodiments, a mechanism for splitting a partition may utilize failover quorum synchronization, external master locks, and/or various methods for detecting and resolving log conflicts, including log snipping (e.g., deleting log records that are on invalid branches). The systems may implement a fault-tolerant log shipping based replication mechanism that includes such log conflict detection and resolution. In some embodiments, log branching may be avoided through post-failover rejoins.

As described above, there may be various reasons why it may be beneficial to split a partition (or the replicas thereof) or to move one or more partitions or partition replicas to different storage nodes (or storage devices thereof). In some embodiments, the storage nodes of a distributed data storage system (e.g., one that provides database services to clients) may be configured to identify candidate partition management operations based on local conditions. For example, in some embodiments, each storage node may periodically query or examine all of its storage devices (e.g., disks or logical storage volumes) to determine what the current resource utilization is (e.g., to determine how much of the total capacity is provisioned for the use of various replicas on each of the storage devices). In other embodiments, the storage nodes may continually monitor the resource utilization for provisioned resources (e.g., using a background task).

In some embodiments, if a particular partition or partition replica gets too big (e.g., if it approaches or exceeds a target size or a threshold on the amount of resources it consumes), one or more of the partitions hosted on the storage node (or storage device) may be split into two or more partitions and/or one or more of the new partitions may be moved to another node/device. In another example, one of the partition replicas may be considered a candidate for being split or moved if the provisioned (or reserved) storage capacity or the provisioned (or reserved) throughput capacity for the storage node (or a storage device thereof) on which it is hosted reaches 80% of its total capacity, or if the partition replica itself reaches a pre-determined absolute size threshold (e.g., 2 GB of provisioned storage). In some embodiments, there may be an upper watermark (e.g., on the order of 80%) that triggers a split or move operation, and a lower watermark (e.g., on the order of 60-70%) that serves as a target for the percentage of resources on a storage node (or device) that are provisioned (or reserved) for the use of various database tables at any given time. In such embodiments, the goal of the partition management operation may be to reduce the amount of provisioned (or reserved) resources to (or just below) the lower watermark, so that there is excess capacity available to handle future growth and/or temporary bursts in resource usage. For example, if disk utilization (in terms of provisioned or reserved storage capacity) is greater than 80% of the total capacity of a disk, a partition management operation may be performed to attempt to move enough partition replicas off the disk to reduce the disk utilization to 60%.

Note that, in some embodiments, the allocation of the resource capacity of each storage device (or logical storage volume) may be distributed among multiple different partition replicas that are hosted on the storage device/volume. In one example, if the rate of input/output operations that a particular storage device is expected (and configured) to be able to handle (e.g., its provisioned capacity) is 1000 write operations per second (1000 IOPS for writes), and the storage device hosts 10 partition replicas, the storage device may in some embodiments provision 100 IOPS for writes for each partition replica. In other embodiments, the provisioned throughput capacity may not be divided equally among the partition replicas hosted on a given storage device. Note that in some embodiments, the selection of partition replicas to be split or moved may be performed based on the provisioned resource capacity of each of the partition replicas, rather than the actual resource capacity being used by each of the partition replicas. In other embodiments, the selection of partition replicas to be split or moved may be based on the actual resource capacity being used by each of the partition replicas. Also note that, in some embodiments, a pre-determined tolerance level may specify a threshold or limit on the number of partitions and/or the amount of provisioned resource capacity that can be affected by a single candidate partition management solution or by all partition management operations being performed substantially concurrently (e.g., during the same time period or overlapping time periods), which may influence the selection of partition replicas to be split or moved (e.g., this may influence the selection of a partition management solution from among multiple potential partition management solutions).

In various embodiments, the order in which candidate partition management operations are scheduled for execution may be dependent on whether the operations include partition splits or partition moves, whether they aim to reduce provisioned storage capacity or reduce throughput capacity on a storage device or logical volume, whether they conflict with each other, whether the total number of partitions (or replicas thereof) involved in partition management at any given time exceeds a pre-determined limit, or whether they were requested by clients. In some embodiments, determining which, if any, partition replicas to split or move may include determining a target amount by which to reduce a provisioned resource (e.g., storage capacity or throughput capacity) on one of the storage devices or logical storage volumes on which database partitions (or replicas thereof) are stored on a given storage node. In some embodiments, the storage nodes (or storage devices themselves) may be configured to make local decisions about which of the partition replicas they host to split or move (and how), and to present their decisions to a central partition management scheduler component (e.g., a module of an administrative component of a distributed database system) as candidate partition management operations. The central partition management scheduler may then determine the order in which to perform the candidate partition management operations according to another partition management policy (e.g., a global resource management policy). In other embodiments, other candidate partition management operations may be introduced to the central partition management scheduler through an explicit request from a customer or a client application (e.g., through a GUI or API). In still other embodiments, a central component (rather than the storage nodes) may also be configured to determine the candidate partition management operations. For example, in some embodiments, storage nodes may send resource utilization data to the central partition management scheduler or a sweeper component/module thereof (e.g., periodically), and the central partition management scheduler (or sweeper component/module) may make the storage-node-level decisions about which, if any, partition moving operations or partition splitting operations should be performed on each storage node and/or device (e.g., using any of the techniques described herein and/or any other suitable techniques). In this example, an event scheduler component/module of the central partition management scheduler may then select various partition management operations (events) to work on (e.g., it may initiate the performance of selected candidate partition management operations).

In some embodiments, the central partition management scheduler may (e.g., during a given scheduling exercise) select multiple candidate partition management operations to be performed substantially concurrently (e.g., if two or more can be scheduled without conflicts and/or without exceeding a pre-determined upper limit on the number or percentage of replicas that can be involved in partition management operations at the same time). In some embodiments, partition splitting operations and/or partition moving operation may be performed by a background process, and such constraints or limits may be applied to avoid having the partition management operations interfere too much with any concurrently executing foreground processes that service customer requests.

In some embodiments, a pre-determined global partition management policy may specify that the central partition management scheduler should schedule partition management operations that include partition splitting operations with a higher priority than those that involve partition moving operations. For example, partition splitting operations may be given higher priority than partition moving operations in systems in which delaying a recommended partition splitting operation is likely to have a bigger impact on the customer/client than delaying a recommended partition moving operation (e.g., if the situation is in danger of reaching a critical point that could affect durability of the partition data). In some embodiments, a pre-determined global partition management policy may specify that the central partition management scheduler should schedule partition moving operations that were triggered by a desire to manage and/or correct storage capacity issues with a higher priority than partition moving operations that were triggered by a desire to manage and/or correct throughput capacity issues. For example, in some embodiments, if a given storage device (e.g., a disk) is in danger of running out of space, a partition replica hosted on that storage device may not be able to grow to meet future needs or higher than expected storage capacity utilization, which could affect (at least in the short term) the ability to service customer requests directed to that partition replica at all. By contrast, a shortage of throughput capacity for a partition replica may be considered more of a performance (rather than correctness) issue, in some embodiments.

In some embodiments, local partition management decisions (e.g., those made on the storage nodes and/or by the central partition management scheduler, or a sweeper component/module thereof, to identify candidate partition management operations) and/or global prioritization decisions (e.g., those made by the central partition management scheduler, or an event scheduler thereof, to determine the relative priorities of candidate partition management operations) may be based on a balancing process, rather than (or in addition to) various threshold-based processes (e.g., those based on an upper limit and/or a lower target for provisioned or reserved resource capacity utilization). In such embodiments, a goal of the local partition management decisions and/or global prioritization decisions may be to maintain a balance between various machines, storage nodes and/or storage devices in terms of throughput capacity and/or disk utilization (e.g., within some range centered around an average utilization). For example, in some embodiments, these processes may be configured to periodically compute an average resource utilization for various machines, storage nodes and/or storage devices in terms of throughput capacity and/or disk utilization and to identify one or more candidate partition management operations that, if performed, may cause the resource utilization on each of those machines, storage nodes and/or storage devices to be within a desired distance of the average resource utilization (e.g., by defining upper and/or lower resource utilization thresholds centered on the average resource utilization).

Note that in some embodiments, a central partition management scheduler (or event scheduler thereof) may consider all candidate partition management operations in the same class as having equal priority (other than if those that would result in conflicts). In other embodiments, candidate partition splitting operations or candidate partition moving operations in the same classes may be further prioritized within those classes. For example, in some embodiments, split operations or move operations that were explicitly requested by a client (e.g., by a customer through a GUI or by a client application through an API) may be given higher priority than candidate partition management operations in the same classes that were determined programmatically by the system. In another example, split operations or move operations within a given class may be prioritized by the sizes of the affected partitions and/or by the rate at which the affected partitions are growing (e.g., in terms of provisioned or reserved storage or throughput capacity).

As described above, when performing various partition management operations in a distributed data storage system (e.g., operations to create tables, to partition tables, to replicate table partitions, to split partitions, and/or to move partition replicas), one or more components of the distributed data storage system (e.g., an administrative opponent or the storage nodes themselves) may be configured to select a destination storage node (or individual storage devices or virtual storage volumes thereof) on which to store a table (or a partition or partition replica thereof). In some embodiments, the selection process may be dependent on metadata about storage nodes and/or storage devices/volumes, including resource related metadata. For example, the selection process may include a filtering operation to narrow the list of candidate storage nodes (or storage devices/volumes) based on the amount or percentage of their resources (e.g., storage resource capacity or IOPS capacity) that is available or that is already provisioned (or reserved) for storing (and subsequently accessing) other data, as well as a confirmation or reservation process that seeks to determine whether a potential host for the table (or partition/replica) can, in fact, host the table (or partition/replica). In some embodiments, providing information about the current or projected size of a partition replica that is to be placed in the storage fleet to a storage node prior to providing the data for the partition replica to the storage node may improve the local selection of a particular storage device/volume by the storage node. In some embodiments, if the projected size of a new or existing table or partition/replica exceeds a pre-determined threshold size, even if its current size is below the threshold size, it may be preemptively split as part of a placement operation (e.g., it may be split prior to being placed on a storage node or storage device/volume).

In some embodiments, resource related metadata used in determining the storage nodes (or storage devices/volumes thereof) on which to place a partition replica may be maintained locally on each storage node. In other embodiments, this information may be maintained by an administrative node that performs various administrative tasks (e.g., partition management tasks and/or resource allocation tasks) for a collection of storage nodes instead of, or in addition to, storing this information on the storage nodes themselves. In some embodiments, the storage nodes and corresponding administrative components may work together to determine the placement of various tables (or partition/replicas thereof) in the storage fleet. For example, in some embodiments, an administrative component may select storage nodes at random and provide IOPS capacity and storage capacity requirements for a table (or partition/replica) to one or more of the randomly selected storage nodes. As described in more detail below, each of these storage nodes may use local health metadata to select one or more appropriate storage devices (e.g., disks) or logical storage volumes on which to store the table (or partition/replica). In some embodiments, the storage node may reserve the selected storage devices/volumes for the table (or partition/replica) until the administrative component provides the data to be stored, or until a reservation timeout period expires. In some embodiments, an administrative component may obtain resource related information from the set of storage nodes for which it is responsible (and, in some cases from other administrative components) and may determine the appropriate storage devices (e.g., disks) or logical storage volumes on which to store the table (or partition/replica) itself.

In various embodiments, the placement of tables, partitions, and partition replicas in the storage layer may be made based, at least in part, on a placement policy that encourages the local and/or global balancing of resource unitization across storage nodes and storage devices/volumes, that encourages node diversity for the partitions and/or partition replicas of each table, that encourages rack diversity for the partitions and/or partition replicas of each table, and/or that encourages diversity in the versions of software components that implement any of the various database or partition management processes described herein for the storage nodes or storage devices/volumes on which the partitions and/or partition replicas of each table are stored.

Figure 9:
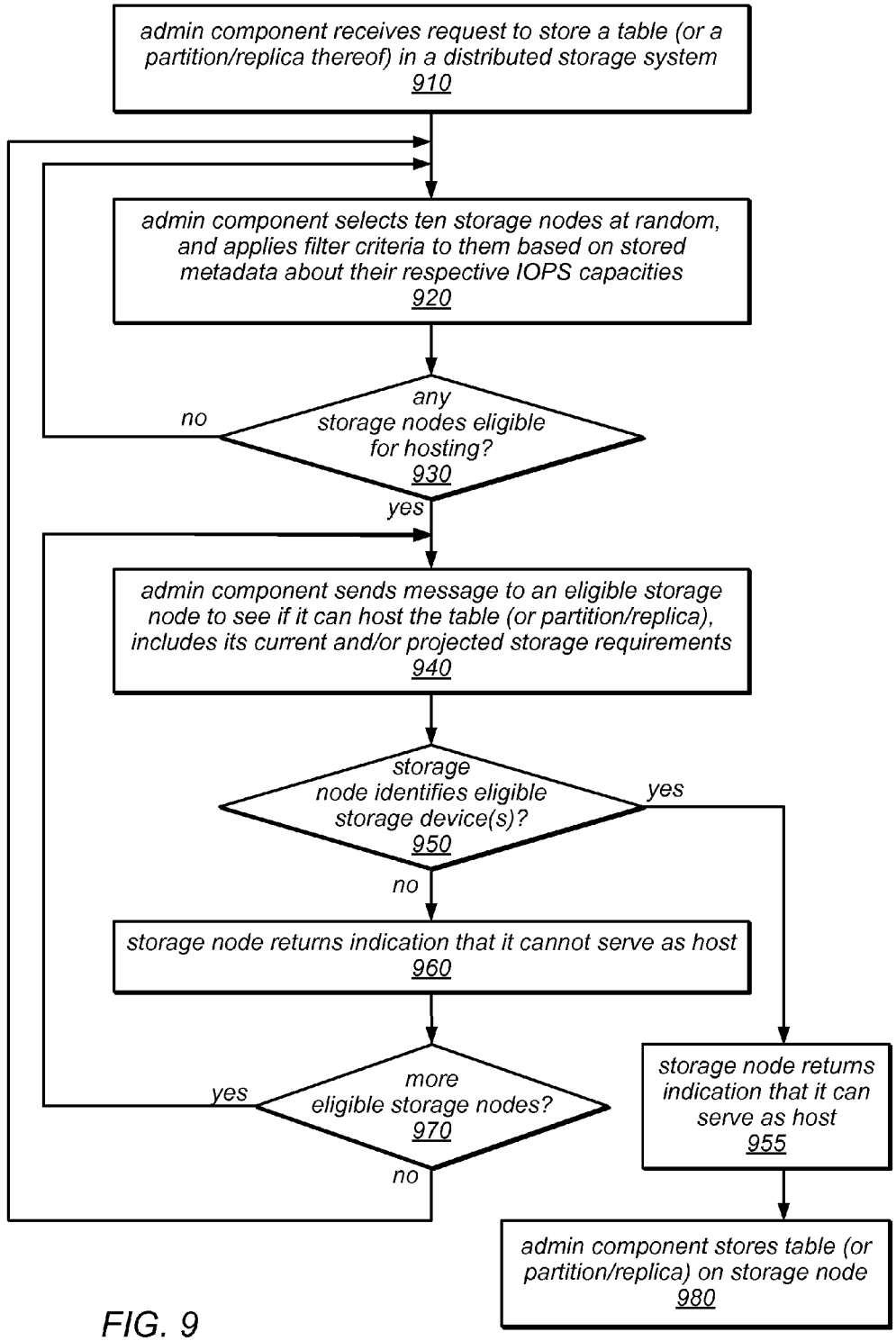
FIG. 9 is a flow diagram illustrating one embodiment of a method for selecting a storage node on which to store a table (or a partition or partition replica thereof).

One embodiment of a method for selecting a storage node on which to store a table (or a partition or partition replica thereof) is illustrated by the flow diagram in FIG. 9. As illustrated at 910, in this example, the method may include an administrative component of a distributed data storage system (e.g., one that implements a non-relational database) receiving a request to store a table (or a partition/replica thereof) in a distributed storage system on behalf of a client (e.g., a customer/subscriber or client application). As illustrated in this example, the method may include the administrative component (which may be similar to auto admin instance 350 in FIGS. 3 and 4) selecting ten of the storage nodes (which may be similar to storage node instances 360 in FIGS. 3 and 4) at random, and applying filter criteria to them based, at least in part, on stored metadata about their respective IOPS capacities, as in 920. For example, the filter criteria may be based on the amount or percentage of the IOPS capacity of each node that is available, or the amount or percentage of the IOPS capacity of each node that is already provisioned or reserved for the use of other tables (or partitions/replicas). In other embodiments, the administrative component may select some other number of storage nodes as an initial set of storage nodes that will be considered for hosting the table (or partition/replica), or may use different filter criteria to narrow the set of storage nodes that will be considered for hosting the table (or partition/replica).

If there are not any storage nodes eligible for hosting (based on the filter criteria), shown as the negative exit from 930, the method may include the administrative component selecting ten more storage nodes (e.g., at random), and repeating the operation illustrated at 920 for those storage nodes. This is illustrated in FIG. 9 as the feedback from 930 to 920. If there are storage nodes eligible for hosting (based on the filter criteria), or once an eligible storage node is identified after selecting one or more additional sets of storage node candidates (shown as the positive exit from 930), the method may include the administrative component sending a message to one of the eligible storage nodes to see it can host the table (or partition/replica), as in 940. As illustrated in this example, the message may include the current and/or projected storage requirements for the table (or partition/replica). For example, the message may include an indication of the current (e.g., observed and/or stored) storage capacity requirements for an existing (and at least partially populated) table (or partition/replica) that is being imported (e.g., from a client or as part of an operation to restore the table/partition/replica from a backup), moved, or split. In another example, the message may include an indication of the expected (or projected) storage capacity requirements for a new or existing table (or partition/replica) based on client hints or requests (e.g., hints or requests made during creation of the table, or estimates made later in anticipation of expected growth, bursting, or other types of fluctuations in resource capacity requirements), observed heat information for the table (or various partitions/replicas thereof), machine learning (e.g., based on the velocity, or rate of change, in the storage capacity consumed by the table/partition/replica), a history of storage capacity requirements for tables maintained on behalf of the same client, a default amount of storage that is assumed for all newly created (e.g., empty) tables or partitions/replicas thereof, or a default amount of storage capacity growth that is assumed for all tables/partitions/replicas, in different embodiments.

If the eligible storage node identifies one or more eligible storage devices (shown as the positive exit from 950), the method may include the storage node returning an indication that it can serve as host (as in 955), and the administrative component storing the table (or partition/replica), or initiating the storage of the table (or partition/replica), on the storage node (as in 980). In this example, identifying eligible storage devices may include identifying one or more disks or virtual storage volumes on the storage node that (collectively) meet the current and/or projected IOPS and storage capacity requirements for the table (or partition/replica). If the eligible storage node is not able to identify eligible storage devices (shown as the negative exit from 950), the method may include the storage node returning an indication that it cannot serve as host for the table (or partition/replica), as in 960.

If there are more eligible storage nodes (shown as the positive exit from 970), the method may include the administrative component sending a message to another one of the previously identified eligible storage nodes to see if it can host the table (or partition/replica), and repeating the operations illustrated in 940-970 or in 940-980 for the other storage node. This is illustrated in FIG. 9 by the feedback from 970 to 940. If there are no additional eligible storage nodes (or once all of the eligible storage nodes have been queried and have returned an indication that they cannot host the table/partition/replica), the method may include the administrative component selecting ten more storage nodes (e.g., at random) and repeating the operations illustrated in 920-980, as applicable, until a suitable placement is found for the table (or partition/replica) or until all options have been exhausted and an error is returned (not shown). This is illustrated in FIG. 9 by the feedback from 970 to 920.

Figure 10:
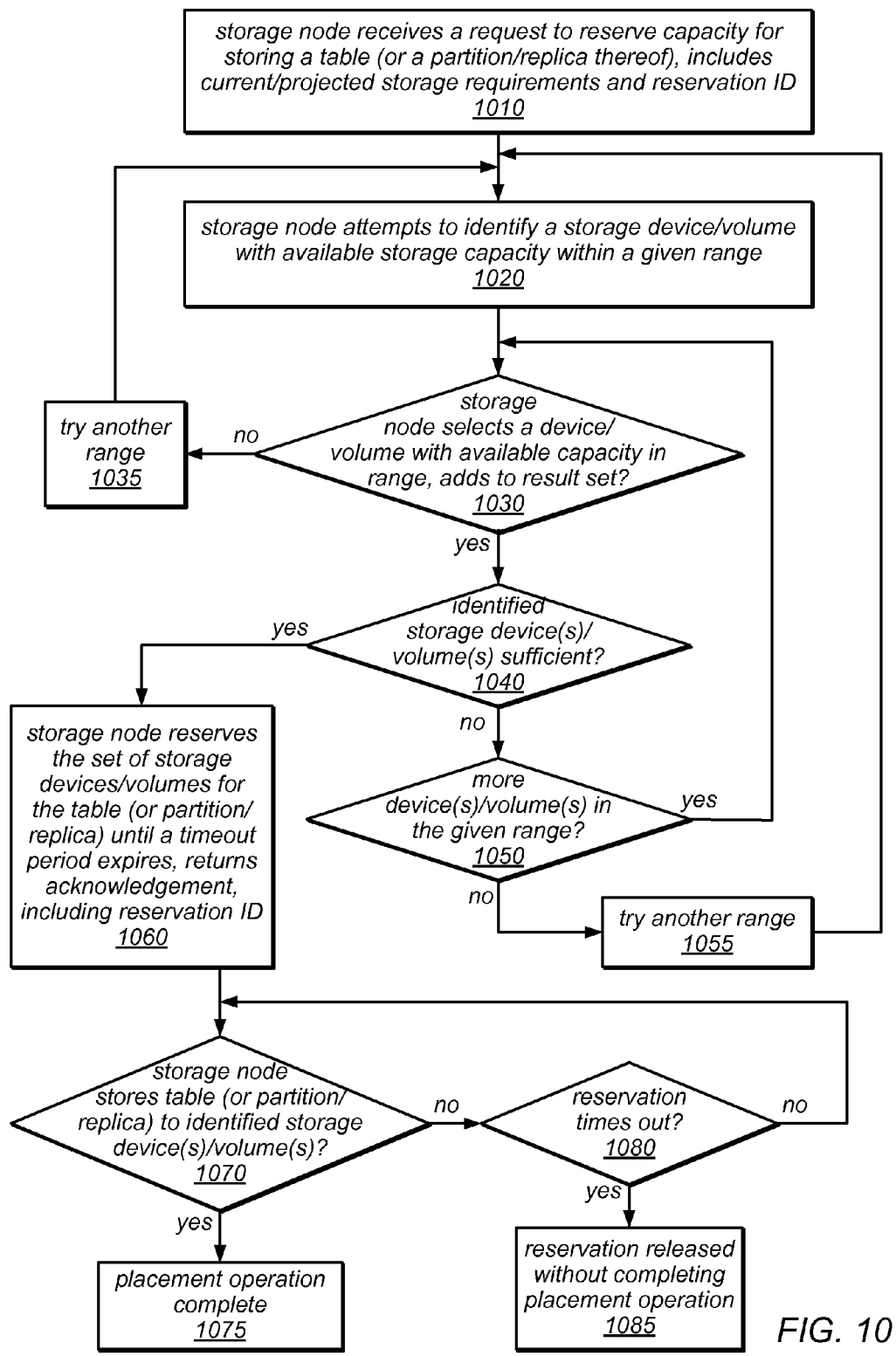
FIG. 10 is a flow diagram illustrating one embodiment of a method for determining one or more storage devices or logical storage volumes of a storage node on which to store a table (or a partition or partition replica thereof).

One embodiment of a method for determining one or more storage devices or logical storage volumes of a storage node on which to store a table (or a partition or partition replica thereof) is illustrated by the flow diagram in FIG. 10. As illustrated in this example, the method may include a storage node of a distributed data storage system (e.g., one that implements a non-relational database) receiving a request to reserve capacity for storing a table (or a partition/replica thereof), as in 1010. The request may be received from an administrative component of the distributed data storage system, and may include an indication of the current and/or projected storage requirements for the table (or partition/replica) and a reservation ID (which may have been generated by the administrative component as part of generating the reservation request). In some embodiments, the administrative component may be similar to an auto admin instance 350 illustrated in FIGS. 3 and 4, and the storage node may be similar to storage node instances 360 illustrated in FIGS. 3 and 4. As described above, the storage capacity information included in the message may include current (e.g., observed and/or stored) storage capacity requirements for an existing table (or partition/replica) that is being imported, moved, or split and/or an indication of the expected (or projected) storage capacity requirements for a new or existing table (or partition/replica) based on client hints or requests (e.g., hints or requests made during creation of the table, or estimates made later in anticipation of expected growth, bursting, or other fluctuations in resource capacity requirements), observed heat information for the table (or various partitions/replicas thereof), machine learning (e.g., based on the velocity, or rate of change, in the storage capacity consumed by the table/partition/replica), a history of storage capacity requirements for tables maintained on behalf of the same client, or a default amount of storage capacity growth that is assumed for all tables/partitions/replicas, in different embodiments. In some embodiments, if the amount of resource capacity (e.g., IOPS capacity or storage capacity) requested or projected by a client is less than the amount of resource capacity typically used by the client or projected by the system based on observed resource consumption, observed rates of growth in resource consumption, or other observations, the storage node may be determined to attempt to reserve more resource capacity for the table/partition/replica than was requested.

As illustrated in this example, the method may include the storage node attempting to identify a storage device/volume that has an amount of available storage capacity within a given range, as in 1020. For example, the storage node may maintain metadata about its storage devices or logical storage volumes indicating which devices/volumes have available capacity within different ranges (e.g., between 100-140 GB available, between 70-100 GB available, etc.). In some embodiments, the ranges may be pre-defined (and static) and may be based on the storage capacity of the underlying physical storage devices (e.g., disks or SSDs). In some embodiments, the storage node may first attempt to identify any storage devices/volumes having the greatest amount of available storage capacity (e.g., available storage capacity within the highest range), regardless of the current or projected storage capacity requirements for the table (or partition/replica). If the storage node is not able to identify and select a storage device or logical storage volume with available storage capacity within the given range and add it to a result set (shown as the negative exit from 1030), the method may include the storage node trying to identify storage devices/volumes that have an amount of available storage capacity in another range (e.g., a lower storage capacity range). This is illustrated in FIG. 10 by the path from 1030 to 1035 and from 1035 to 1020.

As illustrated in this example, if the storage node is able to identify and select a storage device or logical storage volume with available storage capacity in the given range (e.g., selected randomly from among any storage devices/volumes having available storage capacity within that range) and add it to a result set of storage devices/volumes to be reserved for storing the table/partition/replica (shown as the positive exit from 1030), the method may include determining whether the identified storage device(s)/volume(s) are sufficient to host the table/partition/replica (as in 1040). If not (shown as the negative exit from 1040), but there are more storage device(s)/volume(s) having available storage capacity within the given range (shown as the positive exit from 1050), the method may include repeating the operations illustrated as 1030-1050, as applicable, to attempt to identify sufficient storage devices/volumes on the storage node to host the table/partition/replica. This is illustrated in FIG. 10 by the feedback from 1050 to 1030. If there are no additional storage device(s)/volume(s) having available storage capacity within the given range (shown as the negative exit from 1050), the method may include the storage node trying to identify storage devices/volumes that have an amount of available storage capacity in another range (e.g., a lower storage capacity range). This is illustrated in FIG. 10 by the path from 1050 to 1055 and from 1055 to 1020. In other words, in this example, in response to a request to reserve capacity for a table, partition, or partition replica, the storage node may be configured to identify two or more storage devices/volumes on which to store portions of the table, partition, or partition replica (e.g., to split the table, partition, or partition replica) if the storage node is not able to identify a single storage device/volume that has sufficient storage capacity for storing the entire table, partition, or partition replica. In other embodiments, if the storage node is not able to identify a single storage device/volume that has sufficient storage capacity for storing the entire table, partition, or partition replica, the storage node may return an error (not shown).

As illustrated in this example, once the set of identified storage device(s)/volume(s) is sufficient to host the table (or partition/replica), shown as the positive exit from 1040 (e.g., once the set of devices/volumes to be reserved is complete), the method may include the storage node reserving the identified set of storage devices/volumes for the table (or partition/replica) until a reservation timeout period expires, and returning an acknowledgement that the storage node can host the table (or partition/replica) and has reserved sufficient resources for hosting the table (or partition/replica), as in 1060. In some embodiments, the acknowledgement may include the reservation ID that was included in the reservation request and/or an indication of the reservation timeout period.

As illustrated in this example, if the storage node does not immediately store the table (or partition/replica) to the identified (and now reserved) storage device(s)/volume(s), e.g., in response to a request to do so by the administrative component, (shown as the negative exit from 1070), but the reservation has not yet timed out (shown as the negative exit from 1080), the method may include the storage node continuing to hold the reservation until the storage node stores the table/partition/replica to the identified (reserved) storage device(s)/volume(s), or until the reservation timeout period expires. This is illustrated in FIG. 10 by the path from 1080 to 1070 to 1075, or the path from 1080 to 1070, back to 1080 and then to 1085. As illustrated in FIG. 10, if and when the storage node stores the table (or partition/replica) to the identified (reserved) storage device(s)/volume(s) (shown as the positive exit from 1070), the placement operation may be complete (as in 1075). On the other hand, if the storage node does not store the table (or partition/replica) to the identified (reserved) storage device(s)/volume(s) before the reservation times out (shown as the positive exit from 1080), the method may include the storage node revoking the reservation on the identified storage device(s)/volume(s) (e.g., releasing the reserved resource capacity) without completing the placement operation (as in 1085). In some embodiments, if the reservation timeout period expires before the table (or partition/replica) is stored on the identified (reserved) storage device(s)/volume(s), the reservation may be renewed for one or more additional reservation timeout periods, e.g., in response to a request to do so by the administrative component that made the original reservation request (not shown). In some embodiments, the storage node may revoke a reservation (and release reserved resource capacity associated with the reservation) prior to the reservation timeout period expiring in response to a request (e.g., from the administrative component that made the original reservation request) to purge the reservation (not shown). For example, if the current placement attempt is one of a group of placement attempts being performed as part of an overall operation to store an entire table (or multiple partitions or replicas thereof), but it becomes clear (at some point) that the overall operation will fail (e.g., that it will not be possible to successfully place the entire table or all of the multiple partitions/replicas that are the targets of the overall operation), the administrative component may be configured to request that the storage nodes purge any reservations that have already been made by one or more individual placement attempts in support of the overall storage operation.

As previously noted, in some embodiments, the responsibility for determining placements for tables, partitions, and/or replicas (and the functionality to make such determinations) may lie largely (or wholly) in the administrative layer of a distributed data storage system, rather than in the storage layer. In some such embodiments, the administrative layer may include multiple administrative components (which may be similar to auto admin instances 350 in FIGS. 3 and 4), and the administrative layer may maintain global resource related metadata for components all the way down to the level of the individual storage devices or logical storage volumes (e.g., not just at the storage node level). In some such embodiments, the administrative components may not select potential storage nodes to host a table (or partition/replica) at random, but may instead use this global metadata, along with any indications or projections of IOPS capacity and/or storage capacity requirements for the table (or partition/replica) to select the best storage nodes and/or storage devices/volumes for a table/partition/replica placement (or at least storage nodes and/or storage devices/volumes that are highly likely to be able to host the table/partition/replica).

Figure 11:
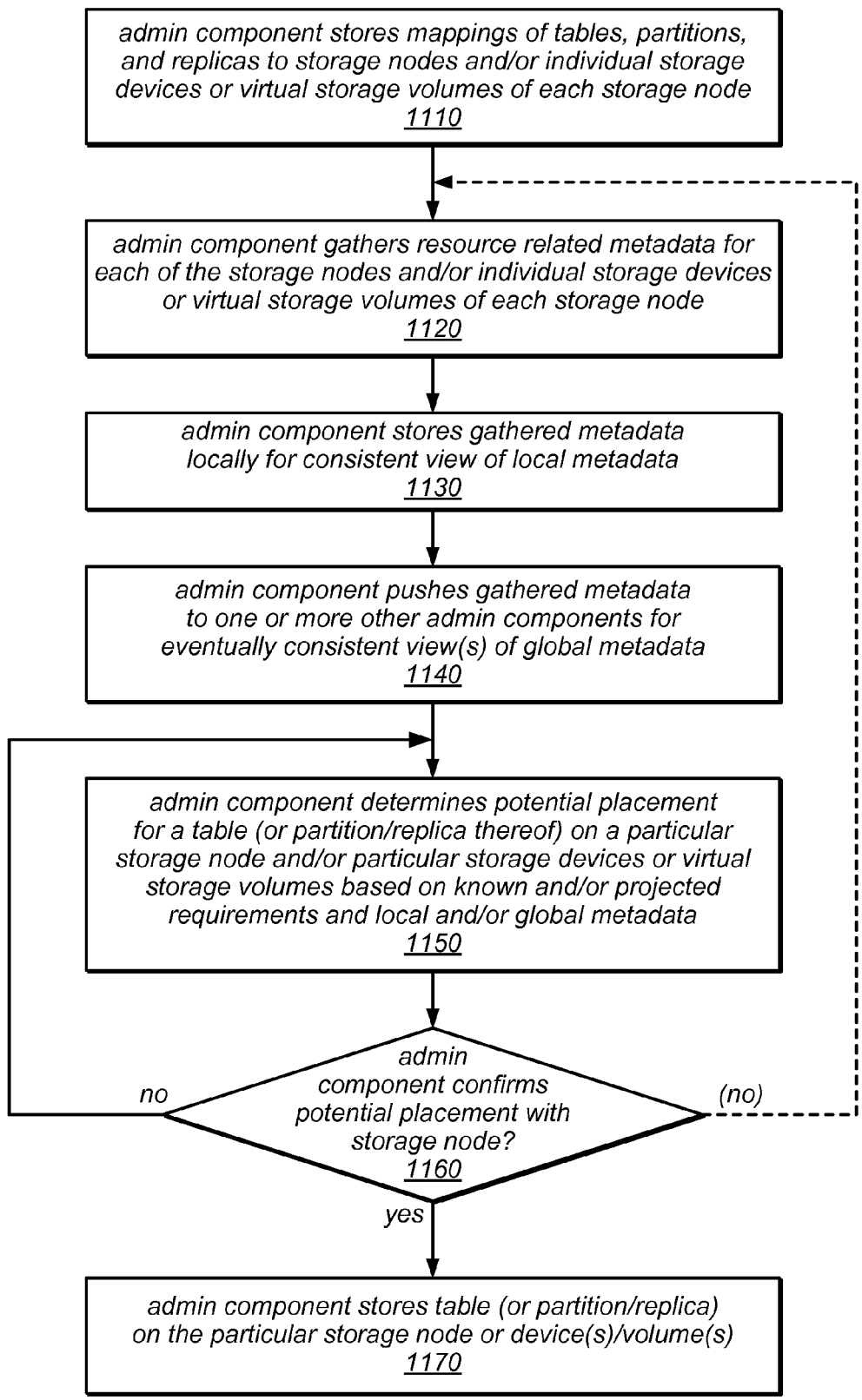
FIG. 11 is a flow diagram illustrating one embodiment of a method for selecting a storage node or particular storage devices/volumes on which to store a table (or a partition or partition replica thereof) based, at least in part, on resource related metadata gathered from one or more storage nodes of a distributed data storage system.

One embodiment of a method for selecting a storage node or particular storage devices/volumes on which to store a table (or a partition or partition replica thereof) based, at least in part, on resource related metadata gathered from one or more storage nodes of a distributed data storage system is illustrated by the flow diagram in FIG. 11. As illustrated at 1110, in this example, the method may include an administrative component of a distributed data storage system (e.g., one that implements a non-relational database) storing mappings of tables, partitions, and replicas to storages nodes and/or individual storage devices or virtual storage volumes of each storage node. In some embodiments, the administrative component may be similar to an auto admin instance 350 illustrated in FIGS. 3 and 4, and the storage node may be similar to storage node instances 360 illustrated in FIGS. 3 and 4. As previously noted, in some embodiments, each administrative component (e.g., auto admin instance) may be responsible for performing administrative operations for multiple storage nodes (e.g., a subset of the storage node instances in the distributed database system), which may include storing this mapping information locally (e.g., in memory).

As illustrated in this example, the method may include the administrative component gathering resource related metadata for each of the storage nodes and/or individual storage devices or virtual storage volumes of each storage node, as in 1120 (e.g., during health checks of the storage nodes for which it is responsible), and storing gathered metadata locally for consistent view of local metadata, as in 1130. The method may also include the administrative component pushing the gathered metadata to one or more other administrative components for eventually consistent view(s) of the global metadata (e.g., the metadata for all of the storage nodes managed by the administrative component and the other administrative components, as in 1140.

As illustrated in FIG. 11, the method may include the administrative component determining a potential placement for a table (or for a partition or partition replica thereof) on a particular storage node and/or particular storage devices or virtual storage volumes based on known and/or projected resource requirements (e.g., storage capacity and/or IOPS capacity requirements) and local and/or global metadata, as in 1150. In other words, rather than relying on an eligible storage node to determine a potential placement on particular ones of its storage devices or virtual storage volumes, this determination may be performed by the administrative component, in some embodiments. As illustrated in this example, if the administrative component is not able to confirm the potential placement with the particular storage node it has selected (shown as the negative exit from 1160), the method may include the administrative component repeating the operation illustrated at 1150 to determine a potential placement for the table (or partition/replica). Note that this may result in the same potential placement or a different potential placement, depending, e.g., on the reason that the administrative component was not able to confirm the originally determined potential placement. For example, in some embodiments, the distributed data storage system may employ a reservation mechanism similar to that illustrated in FIG. 10 and described above (or a different reservation mechanism) or may send a different type of query to the particular storage node in an attempt to confirm that the particular storage node has enough space and/or IOPS capacity to host the table/partition/replica (e.g., based on resource requirements that are known and/or projected at the time). This is illustrated in FIG. 11 by the feedback from 1160 to 1150.

In other embodiments, if the administrative component is not able to confirm the potential placement with the particular storage node it has selected (shown as the negative exit from 1160), the method may include the administrative component repeating the operations illustrated at 1120-1150, which may include gathering additional (or more current) information from various storage nodes and/or other administrative components prior to repeating its attempt to confirm a potential placement for the table/partition/replica (e.g., the same potential placement or a different potential placement). In other words, if the potential placement cannot be confirmed because it was based on what was (or has become) incorrect or out-of-date resource information for the particular storage node, a more likely potential placement may be determined after gathering additional information. This alternatively is illustrated in FIG. 11 by the dashed line from 1160 to 1120.

As illustrated in FIG. 11, if (or when) the administrative component is able to confirm a potential placement with a particular storage node (either the originally determined potential placement or an alternate potential placement), shown as positive exit from 1160, the method may include the administrative component storing the table (or partition/replica) on the particular storage node or device(s)/volume(s), as in 1170. Note that in some embodiments, the administrative component may be configured to direct table/partition/replica data to individual storage devices or logical storage volumes, while in others, the administrative component may direct the table/partition/replica data to the particular storage node (with or without identifying the individual storage devices or logical storage volumes on which to store the data), and may rely on the storage node to make the final placement (either on the individual storage devices or logical storage volumes identified by the administrative component or on other individual storage devices or logical storage volumes, as the storage node sees fit) and to return a result (which may indicate the individual storage devices or logical storage volumes on which the data for the table/partition/replica was actually placed).

As previously noted, in some embodiments, the administrative components (e.g., auto admin instances) of the administrative layer of a distributed data storage system may be responsible for pulling resource related metadata (which may also include the status of the storage devices and/or logical storage volumes) of various storage nodes as part of doing health checks on those storage nodes, and of theses administrative components (e.g., auto admin instances) may be responsible for storing the metadata and status information for the storage nodes for which it performs health checks, along with mapping information for those storage nodes, in memory. In some embodiments, the administrative components may gossip among themselves, which may include each administrative component pushing the set of metadata for which it is responsible to other administrative components and caching metadata received from its peers. In such embodiments, each administrative component may have a blurred (or eventually consistent) global view of the resource capacity and/or resource usage for the storage nodes and storage devices/volumes for the entire storage fleet (or at least for the storage nodes/devices/volumes for which a group of administrative components are collectively responsible, e.g., the storage nodes/devices/volumes of a cluster of storage nodes within the storage fleet, or the storage nodes/devices/volumes located within a particular data center, availability zone, or region).

In some embodiments, if there is a failure of an administrative component (e.g., an auto admin instance), or a membership change for a group of administrative components, this may not require that cached data be discarded. Instead, any remaining administrative components may be assigned a new set of storage nodes for which they are responsible and may they may perform health checks on those storage nodes to begin building up authoritative information about each of those storage nodes. Once generated, this authoritative set of information may be pushed to their peers (e.g., to other administrative nodes), and any local data that was gathered by the administrated components that were previously responsible for those storage nodes may eventually be overwritten by the administrative components that were more recently assigned to those storage nodes. In some embodiments, in the case that all administrative components fail, or when starting a cold cluster, the dataset may be empty and the administrative components may have to rebuild the map (e.g., by performing health checks on the storage nodes, which may take approximately the same length of time as it takes to detect that the storage nodes are healthy). While the map is empty, the administrative components may return an empty candidate list in response to a request to place a table/partition/replica in storage. In that case, the client (e.g., a subscriber or a client process) may back-off and retry the placement operation at a later time.

In some embodiments that support gossiping, if the storage fleet gets too large to effectively maintain a global view of the resource capacity and/or resource usage for all of the storage nodes (or storage devices/volumes thereof), gossiping may be disabled, after which each administrative component may make placement decisions based only on their own local resource related metadata. In some embodiments, the processes that place tables, partition, and/or replicas on particular storage nodes (or storage devices/volumes) may proactively update the in-place map, i.e., the mappings between tables/partitions/replicas and the storage nodes (or storage devices/volumes) on which they are placed when they are placed, e.g., to reduce the inconsistency window for the storage fleet. In some embodiments, snapshots of the storage nodes (or storage devices/volumes), and/or the metadata maintained on the storage nodes or administrative components may be persisted at regular intervals, e.g., for monitoring and/or analysis purposes.

Figure 12:
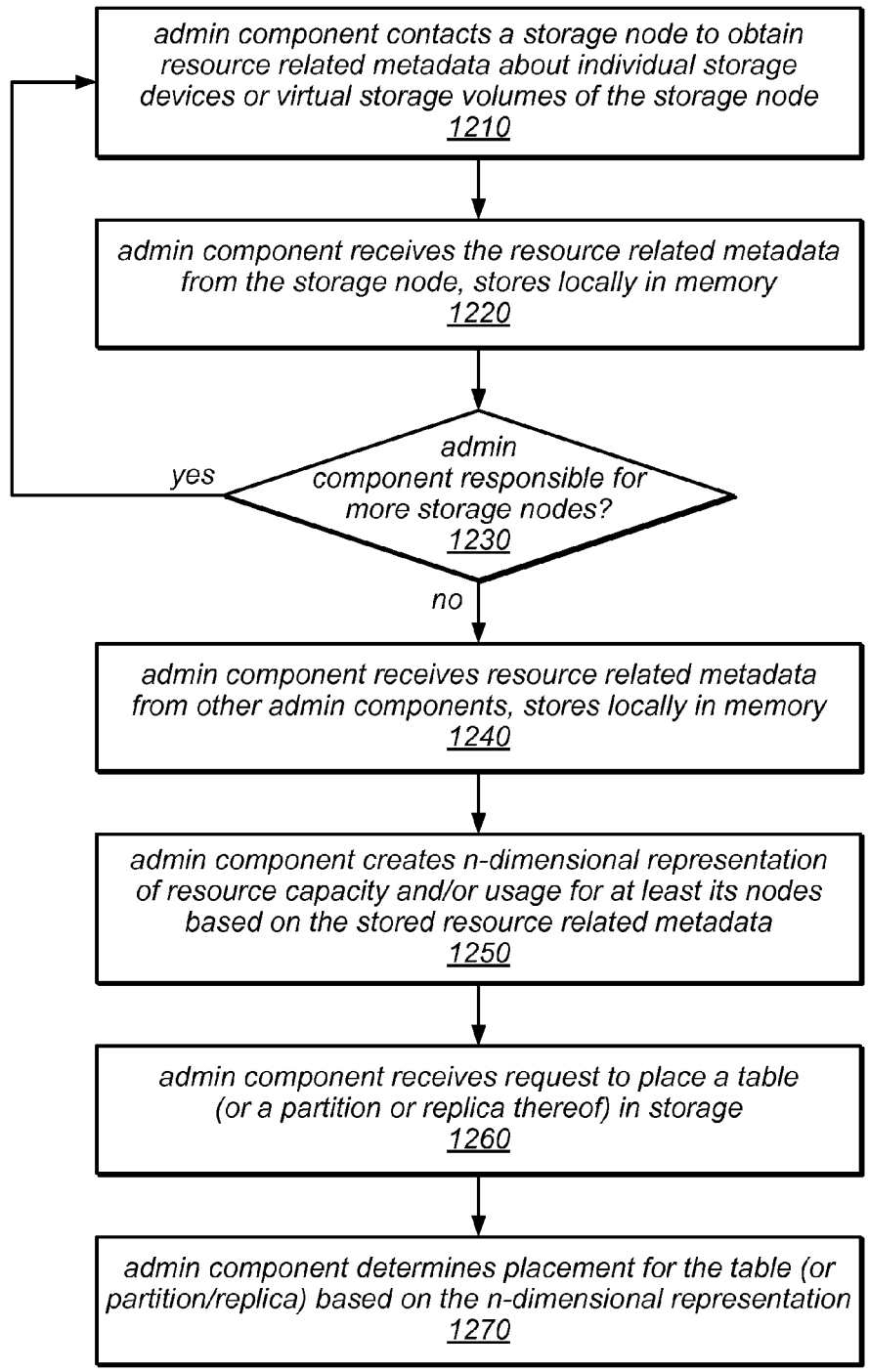
FIG. 12 is a flow diagram illustrating one embodiment of a method for creating a multi-dimensional representation of resource capacity and/or usage and determining placement of a table (or a partition or partition replica thereof) based, at least in part, on the multi-dimensional representation.

One embodiment of a method for creating a multi-dimensional representation of resource capacity and/or usage and determining placement of a table (or a partition or partition replica thereof) based, at least in part, on the multi-dimensional representation is illustrated by the flow diagram in FIG. 12. As illustrated at 1210, in this example, the method may include an administrative component of a distributed data storage system (e.g., one that implements a non-relational database) contacting a storage node (e.g., one of a plurality of storage nodes in the distributed data storage system) to obtain resource related metadata about individual storage devices or virtual storage volumes of the storage node. For example, in various embodiments, the administrative component may gather this information as part of a periodic health check on the storage node instances for which it is responsible, which may be performed periodically or in response to a failure, a performance issue, or another pre-determined trigger condition. In some embodiments, the administrative component may be similar to an auto admin instance 350 illustrated in FIGS. 3 and 4, and the storage node may be similar to storage node instances 360 illustrated in FIGS. 3 and 4. As illustrated in this example, the method may include the administrative component receiving the resource related metadata from the storage node, and storing it locally in memory, as in 1220. In various embodiments, this resource related metadata may indicate the amount or percentage of the storage capacity or IOPS capacity that has already been provisioned or reserved for storing (and subsequently accessing) data, the amount or percentage of the storage capacity or IOPS capacity that is available for the storage of data, or an observed or projected growth rate for the provisioned (or reserved) storage capacity or IOPS capacity, or may include a heat map (or other heat information) indicating the distribution of storage or IOPS capacity across the storage devices or logical storage volumes of the storage node, an indicator of bursting activity, an indication of pending (or candidate) partition management operations for the storage node and/or other resource related metadata for the storage node or its storage devices/volumes.

If the administrative component is responsible for more storage nodes (shown as the positive exit from 1230), the method may include the administrative component repeating the operations illustrated at 1210 and 1220 for those additional storage nodes. This is illustrated in FIG. 12 by the feedback from 1230 to 1210. If the administrative component is not responsible for more storage nodes, or once the administrative component has received resource related metadata from all of the storage nodes for which it is responsible (shown as the negative exit from 1230), the gathering of local resource related metadata may be complete (for the time being). As illustrated in this example, the method may also include the administrative component receiving resource related metadata from one or more other administrative components (e.g., resource related metadata that is associated with the storage nodes for which they are responsible and that was gathered as part of health checks on those storage nodes), and storing this additional metadata locally in memory, as in 1240.

As illustrated in FIG. 12, the method may include the administrative component creating a multi-dimensional representation of resource capacity and/or resource usage for at least its storage nodes (and, in some embodiments, the storage nodes for which the other administrative components are responsible), based, at least in part, on the stored resource related metadata, as in 1250. For example, the administrative component may generate one or more two-dimensional scatter graphs or heat maps, or three-dimensional scatter graphs or heat maps (e.g., where the values of the third variable are represented by color or a projection of "height") using the locally gathered metadata (e.g., a subset of the metadata obtain from the storage nodes for which it is responsible) or using the global metadata (e.g., a subset of the metadata obtained from its own storage nodes and from the storage nodes for which the other administrative components are responsible), in different embodiments.

Figure 14:
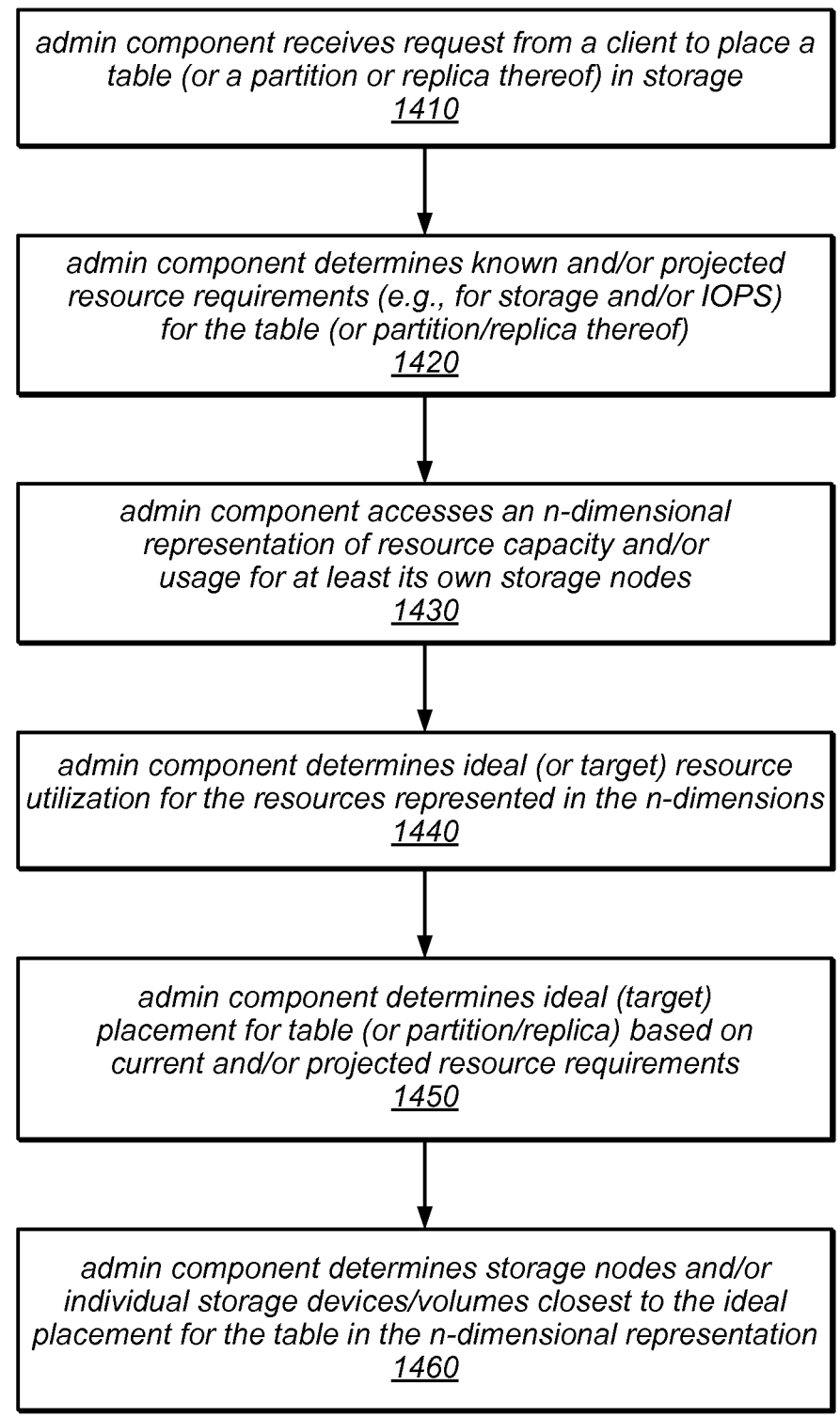
FIG. 14 is a flow diagram illustrating one embodiment of a method for placing a table (or a partition or partition replica thereof) on particular storage nodes and/or individual storage devices/volumes based on a multi-dimensional representation of resource capacity and/or usage.

As illustrated in this example, the method may include the administrative component receiving a request to place a table (or a partition or partition replica thereof) in storage, as in 1260. The method may include the administrative component determining a placement for the table (or partition/replica) based on the multi-dimensional representation, as in 1270. Some examples of the use of a multi-dimensional representation of resource capacity and/or resource usage when determining a placement for various tables/partitions/replicas on particular storage devices or storage devices/volumes (one of which is illustrated in FIG. 14) are described below. Note that while FIG. 12 illustrates an embodiment in which an administrative component "pulls" resource related metadata from its storage nodes, in other embodiments, some or all of the metadata described above and/or usable to generate a multi-dimensional representation of resource capacity and/or resource usage may be "pushed" from the storage nodes (e.g., following performance of a periodic or otherwise triggered local health check, or in response to another pre-determined trigger condition).

Figure 13:
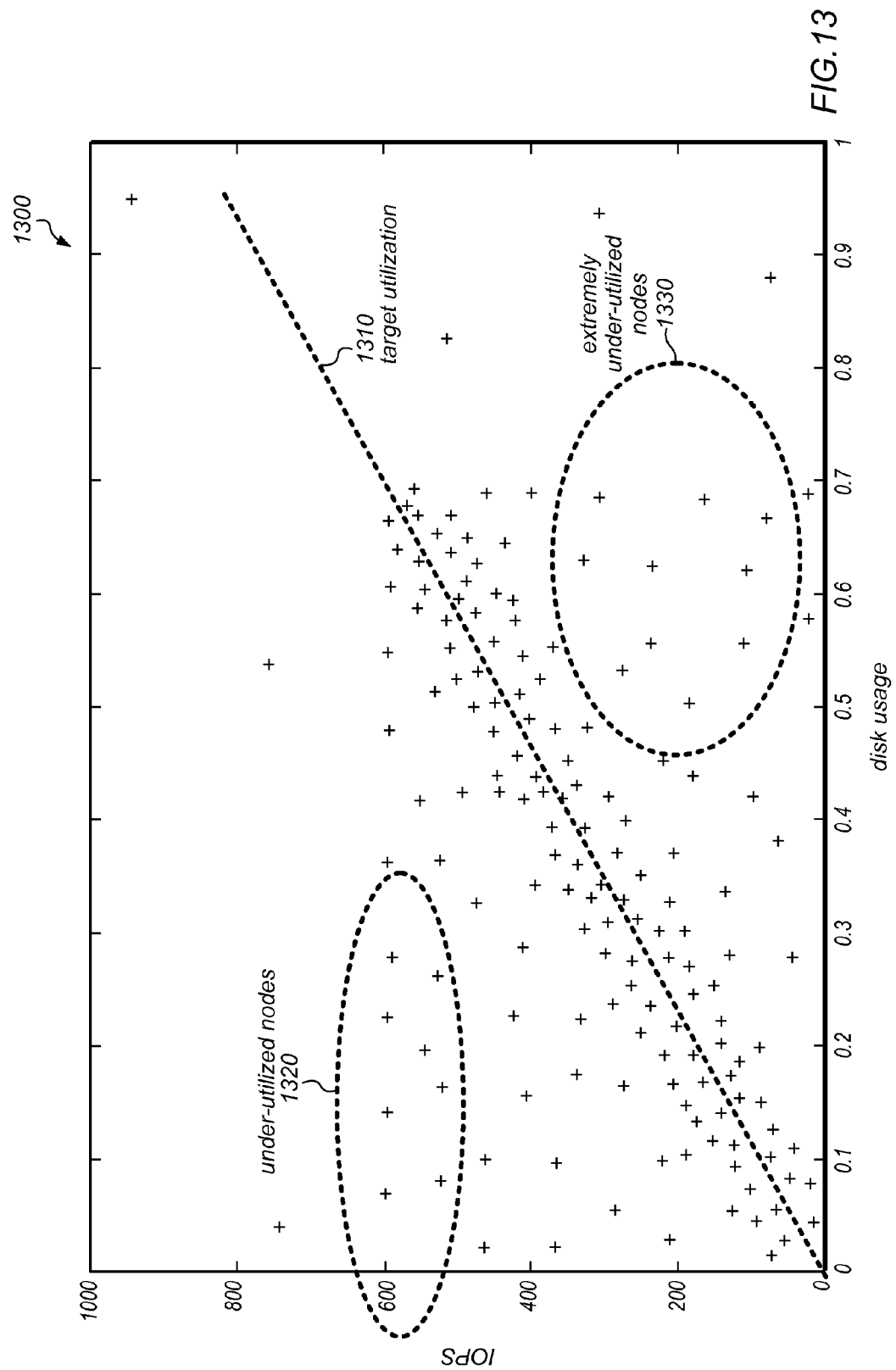
FIG. 13 illustrates an example scatter graph depicting IOPS and disk usage for the storage devices/volumes of a distributed data storage system according to one embodiment.

One example of a scatter graph that depicts IOPS and disk usage for the storage devices or logical storage volumes of a distributed data storage system is illustrated in FIG. 13, according to one embodiment. In this example, scatter graph 1300 is a two-dimensional graph that indicates disk usage (e.g., provisioned storage capacity for each disk), as measured along the x-axis, and IIOPS (e.g., provisioned IOPS capacity for each disk), as measured along the y-axis, at a particular point in time. In scatter graph 1300, each of the crosses represents a particular storage device (e.g., a disk drive), and its placement within scatter graph 1300 indicates the provisioned storage capacity and provisioned IOPS capacity for the particular storage device at the time depicted in the graph. In this example, the maximum IOPS capacity for each disk is 1000 IOPS, and the disk usage is measured in terms of a percentage of the total available storage capacity for each disk (e.g., on a scale from 0-1.0 in increments of 0.1, or 10%). In this example, the diagonal line 1310 (e.g., the target utilization line) represents an ideal (or target) balance for the utilization of the resources of the storage devices, such that storage devices for which there is a high percentage of storage capacity available (e.g., not yet provisioned for the use of any particular table/partition/replica) also have a high percentage of IOPS capacity available.

Ideally, the crosses representing the storage devices (e.g., the disk drives) would cluster around the target utilization line 1310. However, in this example, a large portion of the storage devices are represented by crosses in the upper-left and lower-right corners of graph 1300. Those in the upper-left corner of graph 1300 (labeled as under-utilized nodes 1320) have very little (if any) available IOPS capacity, since most (or all) of the IOPS capacity on these storage devices is already provisioned for the use of various tables/partitions/replicas, but they have a large amount of available storage capacity (as evidenced by the low percentages of provisioned storage capacity for these nodes). The tables (or partitions/replicas) stored on these nodes may (collectively) experience a lot of traffic (e.g., they may be the targets of a lot of accesses by client applications), but they may store very little data. In some embodiments, a placement operation or a balancing type operation may determine that these under-utilized nodes 1320 can be used to store additional tables/partitions/replicas if those tables/partitions/replicas contain large amounts of cold data (e.g., data that is essentially archival and is expected to be accessed rarely, if ever). Conversely, the storage nodes represented by the crosses in the lower-right corner of graph 1300 (labeled as extremely under-utilized nodes 1330) have very little (if any) available storage capacity, since most of the storage capacity on these storage devices is already provisioned for the use of various tables/partitions/replicas, but they have a large amount of available IOPS capacity (as evidenced by the smaller amounts of provisioned IOPS capacity for these nodes). The tables (or partitions/replicas) stored on these nodes may not experience much traffic (e.g., they may not be the targets of very many accesses by client applications), but they may (collectively) store large amounts of data. In some embodiments, a placement operation or a balancing type operation may determine that these extremely under-utilized nodes 1330 can be used to store additional tables/partitions/ replicas if those tables/partitions/replicas are small (and are not expected to grow), but are accessed frequently.

In some embodiments, the distributed data storage systems described herein may be configured to maintain position information for all of the storage nodes and/or storage devices/volumes in the storage fleet (or at least within a cluster of storage nodes or another sub-set of the storage nodes in the storage fleet, e.g., the storage nodes/devices/volumes located within a particular data center, availability zone, or region) with respect to a multi-dimensional space, such as that illustrated in scatter graph 1300. In such embodiments, a goal of the placement operations and/or balancing operations described herein (e.g., the goal when creating a candidate placement list for a table/partition/replica or when selecting a placement from a candidate placement list) may be to identify a suitable placement for the table/partition/replica that moves the overall resource utilization toward (rather than away from) an ideal or target resource utilization. In some embodiments, this may include identifying an ideal placement for the table/partition/replica in the multi-dimensional coordinate system, using the m storage devices that are closest to the ideal placement as the candidate hosts for the table/partition/replica and selecting a suitable host for the table/partition/replica from among the candidate hosts.

In some embodiments, the identification of candidate hosts for a table/partition/replica and/or the selection of one of the candidate hosts for the eventual placement of the table/partition/replica may take into account the position of the candidate hosts in the multi-dimensional coordinate system following the placement of the table/partition/replica, and/or its position subsequent to any projected changes in the IOPS capacity requirements or storage capacity requirements for the table/partition/replica.

In one example, if the information illustrated in FIG. 13 is known, an approach to placing a partition replica may include the following steps:

Identify a point A=(0, y), where the provisioned IOPS capacity (y) is low if the partition replica to be placed requires a large amount of IOPS capacity, or where the provisioned IOPS capacity (y) is high if the partition replica to be placed requires only a small amount of IOPS capacity. In this example, the resulting available IOPS capacity (following placement) may be in the range of [0: (1000-partition_IOPS-IOPS_buffer)], where "partition_IOPS" represents the current or projected IOPS capacity requirement for the partition replica to be placed, and "IOPS_buffer" represents an amount of IOPS capacity that is to be left un-provisioned (e.g., in order to handle bursts or unexpected growth).

Identify the m storage devices that are closest to point A.

Return the list of m storage devices as the placement candidate list for the partition to be placed.

Select one of the m storage devices on the placement candidate list as the destination for the partition replica (e.g., the storage device on the placement candidate list that has the most available storage capacity, or a storage device selected randomly from among the storage devices on the placement candidate list that have sufficient storage capacity for the partition replica).

As illustrated in this example, the storage devices that are to be considered for inclusion in the placement candidate list may initially be identified based only on the basis of the required IOPS capacity for the partition replica to be placed, and then one of the candidate storage devices may be selected from among those candidate storage devices. As illustrated above, the selection of the destination for the partition replica may be based on the required storage capacity for the partition replica to be placed, or may not actually take the projected size of the partition into account (e.g., it may merely attempt to place the partition on the least-full drive for which there is sufficient IOPS capacity). However, in other embodiments, a more advanced policy may identify a point B=(x, y), where x is dependent on the current (or projected maximum) partition size. In such embodiments, searching for the storage devices that are closest to point B may include excluding from the search domain any storage devices on which the partition replica to be placed would not fit. For example, when fitting a partition replica that is projected to consume up to 1000 IOPS, and 5 GB of storage, the search domain may be defined as including storage devices that meet the following criteria: IOPS[0:5000], DISK[0:(70%-5 GB)]. In other words, the search domain may include storage devices on which the already provisioned IOPS capacity is 5000 IOPS or fewer (such that the storage devices has at least 1000 IOPS available), and on which the already provisioned storage capacity is no more than 70% of the total storage capacity for the device less the 5 GB required for the partition replica to be placed.

One embodiment of a method for placing a table (or a partition or partition replica thereof) on particular storage nodes and/or individual storage devices/volumes based on a multi-dimensional representation of resource capacity and/or usage is illustrated by the flow diagram in FIG. 14. As illustrated in this example, the method may include an administrative component of a distributed data storage system (e.g., one that implements a non-relational database) receiving a request from a client to place a table (or a partition or partition replica thereof) in storage (e.g., on one of a plurality of storage nodes in the distributed data storage system), as in 1410. In some embodiments, the administrative component may be similar to an auto admin instance 350 illustrated in FIGS. 3 and 4, and the storage nodes may be similar to storage node instances 360 illustrated in FIGS. 3 and 4. As illustrated in this example, the method may include the administrative component determining known and/or projected resource requirements (e.g., requirement for storage capacity and/or IOPS capacity) for the table (or partition/replica), as in 1420. For example, in some embodiments, the request itself may include an indication of the current (e.g., observed and/or stored) storage capacity requirements for an existing table (or partition/replica) that is being imported, moved, or split or an indication of the expected (or projected) storage capacity requirements for a new or existing table (or partition/replica) based on client hints or requests (e.g., hints or requests made during creation of the table, or estimates made later in anticipation of expected growth), observed heat information for the table (or various partitions/replicas thereof), machine learning (e.g., based on the velocity, or rate of change, in the storage capacity consumed by the table/partition/replica), a history of storage capacity requirements for tables maintained on behalf of the same client, and/or a default amount of storage capacity growth that is assumed for all tables/partitions/replicas. In other embodiments, some or all of this information may be obtained by the administrative component from the storage nodes and/or from a memory in which the information was stored following a previously performed health check or other information gathering operation.

As illustrated in this example, the method may include the administrative component accessing a multi-dimensional representation of resource capacity and/or resource usage for at least its own storage nodes (e.g., for the overall resource capacity or usage for each node and/or for the resource capacity or usage for each of the individual storage devices or logical storage volumes of each node), as in 1430. For example, the administrative component may access a two-dimensional representation of provisioned resource capacity for the individual storage devices of one or more storage nodes, such as the scatter graph illustrated in FIG. 13, or a representation of resource capacity or resource usage that considers more than two resource related parameters (e.g., multiple two-dimensional graphs or heat maps, one or more three-dimensional graphs or heat map, etc.). In different embodiments, the multi-dimensional representations may represent local conditions (e.g., those of the storage nodes for which the administrative nodes is responsible) or global conditions (e.g., those of the storage nodes for which the administrative nodes is responsible and of the storage nodes for which other administrative nodes are responsible). The method may also include the administrative component determining an ideal (or target) resource utilization for the resources represented in the multi-dimensional representation, as in 1440. For example, in the two-dimensional representation of provisioned resource capacity illustrated in FIG. 13, the ideal resource utilization is represented by target utilization line 1310. For representations involving more than two resource related parameters, the ideal (or target) resource utilization may be represented in other ways.

As illustrated in this example, the method may include the administrative component determining an ideal (or target) placement for table (or partition/replica) based on the current and/or projected resource requirements for the table (or partition/replica), based, at least in part, on the multi-dimensional representation of the resource capacity or resource utilization, as in 1450. For example, an ideal (or target) placement may be determined by identifying a particular location in the graph such that the representation of a storage node or device/volume at that location would be on (or near) a target utilization line (or other representation of the ideal or target resource utilization) based on the current resource requirements of the table/partition/replica and/or following any projected growth in the resource requirements of the table/partition/replica. In other words, an ideal (or target) placement for the table/partition/replica may be a location in the graph such that a storage node or device/volume at that location in the graph would move toward the target utilization line (or other representation of the ideal or target resource utilization), rather than away from it, following any projected growth in its resource requirements, or a location in the graph that is on (or very near) the target utilization line (or other representation of the ideal or target resource utilization) if no growth is expected in its resource requirements.

As illustrated in this example, the method may include the administrative component determining the storage nodes and/or individual storage devices/volumes closest to the ideal placement for the table in the multi-dimensional representation, as in 1460. In some embodiments, the method may include identifying a storage node or device/volume that is represented in the graph at a location nearest to the ideal (or target) placement location described above. For example, in an embodiment that utilizes the example scatter graph illustrated in FIG. 13, if the storage capacity requirements for the table/partition/replica are projected to grow, the administrative component may be configured to place the table/partition/replica on a storage node or device/volume represented by a point on the graph to the left of target utilization line 1310 (to allow for that growth without upsetting the overall resource utilization of the storage fleet, or at least within a cluster of storage nodes or another sub-set of the storage nodes in the storage fleet, e.g., the storage nodes/devices/volumes located within a particular data center, availability zone, or region) and/or if the IOPS capacity requirements for the table/partition/replica are projected to grow, the administrative component may be configured to place the table/partition/replica on a storage node or device/volume represented by a point on the graph below the target utilization line 1310 (to allow for that growth without upsetting the overall resource utilization of the storage fleet, or at least within a cluster of storage nodes or another sub-set of the storage nodes in the storage fleet).

Note that in some embodiments, rather than creating a multi-dimensional representation of the resource capacity and/or resource usage of the storage nodes (or storage devices/volumes) of a distributed data storage system where n is relatively large, the administrative components may be configured to generate multiple different representations involving fewer dimensions (e.g., fewer resource related factors) each. In such embodiments, the contributions of each of these representations toward the placement of a table (or partition/replica) may be weighted such that particular resource related parameter values (or combinations of parameter values) have more influence on placement decisions than others.

As previously noted, in some embodiments, a balancer process (e.g., a balancer process running on an administrative component) may gather or accesses information about each of the storage nodes in the system (and/or their storage devices/volumes) in order to determine whether to move any partitions or replicas to better balance the resource utilization across the storage fleet (or at least across a portion of the storage fleet, such as across a cluster of storage nodes, or across the storage nodes/devices/volumes located within a particular data center, availability zone, or region). In other words, a balancer process may be employed in order to determine partition management operations (e.g., operations to split and/or move various partition replicas) to be performed in order to move toward an ideal (or target) resource utilization that is more balanced at the system level (e.g., between storage nodes). In some such embodiments, when the balancer process runs (e.g., periodically, or in response to various trigger conditions), it may have a global view of the resource capacity and resource usage in the system and may prioritize work across the system, rather than locally. In one embodiment, an example balancer policy may be configured to initiate a swap of two partitions between storage nodes that are represented as the two points in a graph (e.g., the scatter graph illustrated in FIG. 13) that are furthest away from the ideal or target utilization for the system (e.g., as represented by target utilization line 1310 in FIG. 13), on opposite sides of the graph. In such embodiments, the balancer may be configured to move a partition that is projected to consume a large amount of storage capacity, but a small amount of IOPS capacity from a storage device represented by a cross in the lower right corner of the graph to a storage device represented by a cross in the upper right corner of the graph.

One embodiment of a method for performing a resource balancing operation in a distributed data storage system is illustrated by the flow diagram in FIG. 15. As illustrated at 1510, in this example, the method may include an administrative component of a distributed data storage system (e.g., one that implements a non-relational database), or a balancing process thereof, accessing a multi-dimensional representation of resource capacity and/or resource usage for at least its own storage nodes (e.g., for the overall resource capacity or usage for each storage node and/or for the resource capacity or usage for each of the individual storage devices or logical storage volumes of each storage node). For example, the balancer process may access a local or global representation of resource capacity and/or resource usage, as described above, periodically or in response to a pre-defined trigger condition (e.g., after a pre-defined number of partition management operations, such as operations to move a partition or a replica thereof, or operations to split a partition or a replica thereof) in order to maintain (or regain) a desired balance in the resource utilization across the storage fleet, or at least within a cluster of storage nodes or another sub-set of the storage nodes in the storage fleet. In some embodiments, the administrative component may be similar to an auto admin instance 350 illustrated in FIGS. 3 and 4, and the storage nodes may be similar to storage node instances 360 illustrated in FIGS. 3 and 4.

As illustrated in this example, the method may include the administrative component (or a balancer process thereof) determining the known and/or projected resource capacity requirements (e.g., requirements for storage capacity and/or IOPS capacity) for the storage nodes, as in 1520. For example, the balancer process may be configured to determine, for each of the storage nodes, the amount or percentage of the storage capacity or IOPS capacity that has already been provisioned (or reserved) for storing (and subsequently accessing) data, the amount or percentage of the storage capacity or IOPS capacity that is available for the storage of data, an observed or projected growth rate for the provisioned storage capacity or IOPS capacity, a heat map (or other heat information) indicating the distribution of storage or IOPS capacity across the storage devices or logical storage volumes of the storage node, an indicator of bursting activity, an indication of pending (or candidate) partition management operations for the storage node and/or other resource related metadata for the storage node or its storage devices/volumes, using any of the techniques described herein for gathering this information (e.g., receiving this information from clients, receiving this information from the storage nodes themselves when performing health checks for the storage nodes, or deriving this information from information received from clients and/or the storage nodes), or using any other suitable techniques for gathering this information.

As illustrated in FIG. 12, the method may include the administrative component (or a balancer process thereof) determining current and/or projected deviations from an ideal (or target) resource utilization for the storage node resources represented in the multi-dimensional representation, as in 1530. For example, the administrative component may be configured to determine the individual or aggregate (e.g., maximum, average, or median) distance(s) between points representing the storage nodes or devices/volumes in a two-dimensional graph (such as the scatter graph illustrated in FIG. 13), and a representation of the ideal (or target) resource utilization for the storage node resources represented in the multi-dimensional representation (such as target utilization line 1310 in FIG. 13). The method may also include the administrative component determining the highest priority partition management operations to perform in order to move the storage fleet (or at least the storage nodes within a cluster of storage nodes or another sub-set of the storage nodes in the storage fleet) toward the ideal (or target) resource utilization, based on the relative deviations from the ideal (or target) resource utilization representation of each of the storage nodes or devices/volumes, as in 1540. For example, in some embodiments, the administrative component (or balancer process) may be configured to move partitions or partition replicas that are currently hosted on the most heavily-utilized storage nodes and/or individual storage devices/volumes to storage nodes and/or individual storage devices/volumes that are the most under-utilized. As illustrated in this example, the method may include the administrative component initiating the performance of at least some of the highest priority partition management operations, as in 1550. Note that after performing one or more of the highest priority partition management operations, the administrative component (or balancer process) may be configured to repeat the operations illustrated in FIG. 15 to assess the results (e.g., to determine whether the operation(s) moved the storage fleet (or at least the storage nodes within a cluster of storage nodes or another sub-set of the storage nodes in the storage fleet) toward the ideal or target resource utilization), or the administrative component (or balancer process) may be configured to repeat the operations illustrated in FIG. 15 periodically or in response to another type of trigger condition, in different embodiments.

Figure 16:
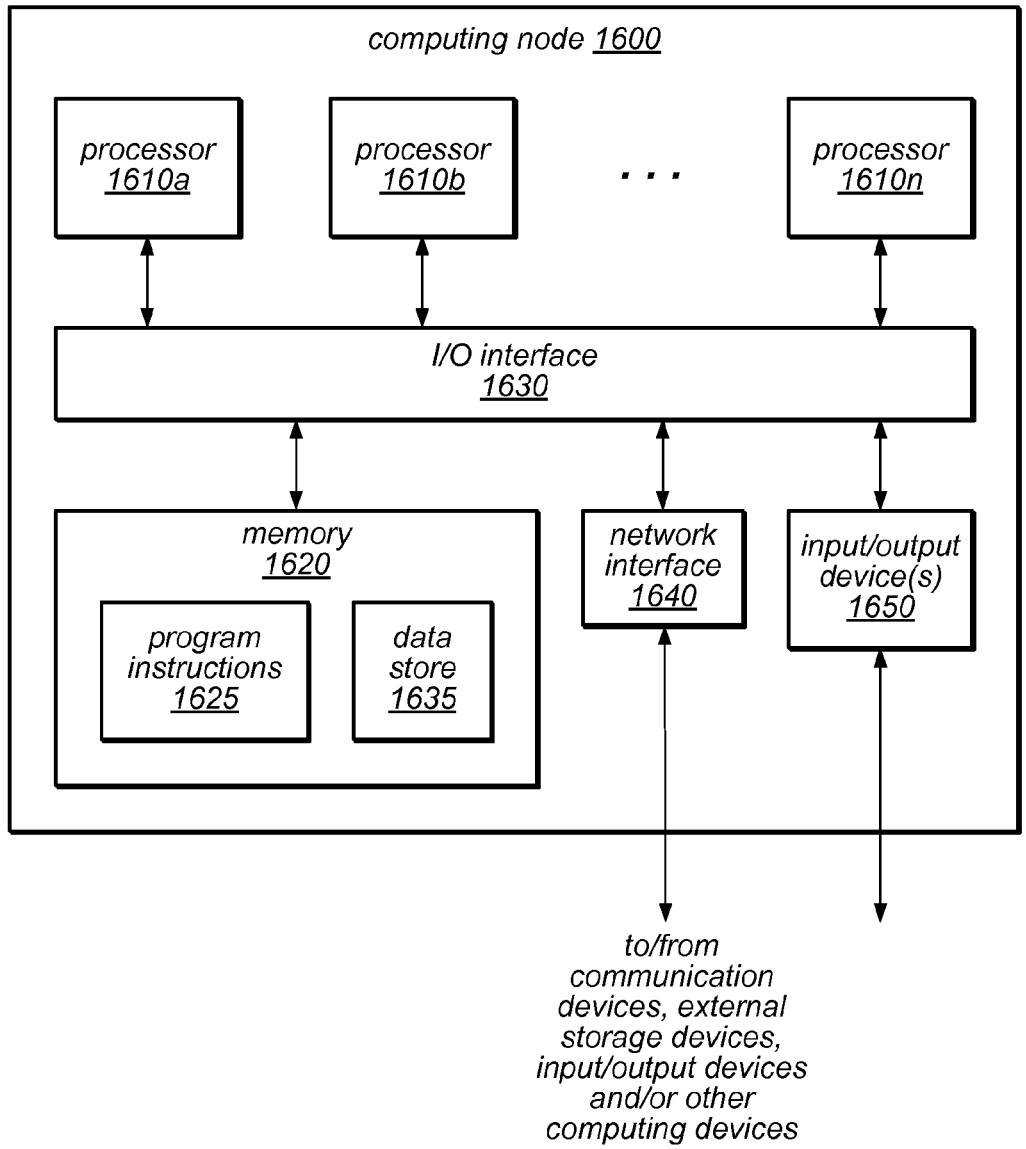
FIG. 16 is a block diagram illustrating a computing node that implements one or more of the techniques described herein for managing partitions of various tables and/or scheduling partition management operations in a distributed database system, according to various embodiments.

One embodiment of a computing node that implements one or more of the techniques described herein for placing tables, partitions, or replicas on particular storage nodes or storage devices/volumes in a data storage service (e.g., a distributed database service) is illustrated by the block diagram in FIG. 16. Computing node 1600 may include functionality to provide any or all of the components of a system that implements such a data storage service, or multiple computing nodes similar to or different from computing node 1600 may collectively provide this functionality, in different embodiments. For example, in various embodiments, one or more computing nodes 1600 may implement any number of storage service clients 310, a front end module 340, any number of auto admin instances 350, any number of storage devices (such as storage node instances 360), and/or any other components of a Web services platform 330, an auto admin cluster, or external resources that interact with Web services platform 330 (such as external workflow component 370). Any number of those storage node instances 360 may each host one or more replicas of various data partitions and/or metadata associated therewith. For example, any given storage node instance 360 may host a replica acting as master replica for its replica group and/or a replica acting as a slave replica in its replica group. In various embodiments, any or all of the techniques described herein for performing partitioning, repartitioning (e.g., through partition splitting and/or partition moving), replication, placement (of tables, partitions, or replicas), and/or otherwise managing partition data may be performed by one or more components of the storage node instances 360 that host a master replica and/or a slave replica, such as partition manager 470 and replication and failover component 475 illustrated in FIG. 4C or by one or more components of a auto admin instance 350 (e.g., partition management scheduler 420, which may include a sweeper component/module and/or an event scheduler component/module).

In some embodiments that include multiple computing nodes 1600, all of the computing nodes 1600 may include the same or similar hardware components, software components, and functionality, while in other embodiments the computing nodes 1600 comprising a computing system configured to implement the functionality described herein may include a wide variety of hardware components, software components, and functionality. In some embodiments, multiple computing nodes 1600 that collectively implement a data storage service may be components of a larger shared resource system or grid computing system. It is noted that different elements of the system described herein may be implemented by different computing nodes 1600. For example, a computer system that supports the functionality described herein for placing tables, partitions, or replicas on particular storage nodes or storage devices/volumes may be implemented on the same computing node 1600 on which a client (through which a customer or subscriber may access the system) executes, or on another computing node 1600, in different embodiments. In another example, different subsystems (e.g., a Web service interface, an admission control subsystem, a service request subsystem; and/or one or more Web servers or other components) may be implemented on or across multiple ones of the computing nodes, and each of the computing nodes may be similar to computing node 1600.

In the illustrated embodiment, computing node 1600 includes one or more processors 1610 coupled to a system memory 1620 via an input/output (I/O) interface 1630. Computing node 1600 further includes a network interface 1640 coupled to I/O interface 1630, and one or more input/output devices 1650. As noted above, in some embodiments, a given node may implement the functionality of more than one component of a system that manages and maintains data in tables and in various partitions thereof (e.g., in a non-relational database) on behalf of data storage service clients, such as that described herein. In various embodiments, a computing node 1600 may be a uniprocessor system including one processor 1610, or a multiprocessor system including several processors 1610 (e.g., two, four, eight, or another suitable number). Processors 1610 may be any suitable processor capable of executing instructions. For example, in various embodiments processors 1610 may be general-purpose or embedded processors implementing any of a variety of instruction set architectures (ISAs), such as the x86, PowerPC, SPARC, or MIPS ISAs, or any other suitable ISA. In multiprocessor systems, each of processors 1610 may commonly, but not necessarily, implement the same ISA. Similarly, in a distributed computing system such as one that collectively implements a data storage service, each of the computing nodes may implement the same ISA, or individual computing nodes and/or replica groups of nodes may implement different ISAs.

In some embodiments, system memory 1620 may include a non-transitory, computer-readable storage medium configured to store program instructions and/or data (shown as program instructions 1625 and data store 1635, respectively) that are accessible by processor(s) 1610. In various embodiments, system memory 1620 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, methods or techniques (such as functionality for placing tables, partitions, or replicas on particular storage nodes or storage devices/volumes using any or all of the mechanisms described herein), are shown stored within system memory 1620 as code 1625. For example, program instruction 1625 may include program instructions that when executed on processor(s) 1610 implement any or all of a storage service client 310, a front end module 340 (which may include a user interface), an auto admin instance 350, a storage node instance 360, an admin console 465, a partition management partition management scheduler 420, a request router, a staging host, one or more metadata tables, an external workflow component 370, and/or any other components, modules, or sub-modules of a system that provides the data storage system and services described herein. Program instructions 1625 may also include program instructions configured to implement additional functionality of a system that implements a data storage service not described herein.

It is noted that in some embodiments, code 1625 may include instructions and data implementing desired functions that are not directly executable by processor 1610 but are represented or encoded in an abstract form that is translatable to instructions that are directly executable by processor 1610. For example, code 1625 may include instructions specified in an ISA that may be emulated by processor 1610, or by other code 1625 executable on processor 1610. Alternatively, code 1625 may include instructions, procedures or statements implemented in an abstract programming language that may be compiled or interpreted in the course of execution. As non-limiting examples, code 1625 may include code specified in a procedural or object-oriented programming language such as C or C++, a scripting language such as perl, a markup language such as HTML or XML, or any other suitable language.

Data storage 1635 may in various embodiments include collections of data maintained by a data storage service on behalf of its clients/users, and/or metadata used by a computing system that implements such a service, as described herein (including, but not limited to, tables managed and maintained on behalf of clients/users of the service, metadata tables, business rules, partition maps, routing tables, indexes, namespaces and/or partitions thereof, service level agreement parameter values, subscriber preferences and/or account information, performance data, resource capacity data, resource usage data, provisioned resource utilization data, reserved resource data, resource reservation IDs, resource reservation timeout period values, parameter values for various partition management policies, limits, or constraints, and/or information about candidate partition management operations).

In other embodiments, program instructions and/or data as described herein for implementing a data storage service that employs the techniques described above may be received, sent or stored upon different types of computer-readable media or on similar media separate from system memory 1620 or computing node 1600. Generally speaking, a computer-readable medium may include storage media or memory media such as magnetic or optical media, e.g., disk or CD/DVD-ROM coupled to computing node 1600 via I/O interface 1630. Program instructions and data stored on a computer-readable storage medium may be transmitted to a computing node 1600 for execution by a processor 1610a by transmission media or signals such as electrical, electromagnetic, or digital signals, which may be conveyed via a communication medium such as a network and/or a wireless link, such as may be implemented via network interface 1640.

In one embodiment, I/O interface 1630 may be configured to coordinate I/O traffic between processor(s) 1610, system memory 1620, and any peripheral devices in the computing node, including network interface 1640 or other peripheral interfaces, such as input/output devices 1650. In some embodiments, I/O interface 1630 may perform any necessary protocol, timing or other data transformations to convert data signals from one component (e.g., system memory 1620) into a format suitable for use by another component (e.g., processor 1610). In some embodiments, I/O interface 1630 may include support for devices attached through various types of peripheral buses, such as a variant of the Peripheral Component Interconnect (PCI) bus standard or the Universal Serial Bus (USB) standard, for example. In some embodiments, the function of I/O interface 1630 may be split into two or more separate components, such as a north bridge and a south bridge, for example. Also, in some embodiments some or all of the functionality of I/O interface 1630, such as an interface to system memory 1620, may be incorporated directly into processor 1610.

Network interface 1640 may be configured to allow data to be exchanged between computing node 1600 and other devices attached to a network (such as other computer systems, communication devices, input/output devices, or external storage devices), or between other nodes in a system providing shared computing services. In various embodiments, network interface 1640 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1650 may, in some embodiments, include one or more display terminals, keyboards, keypads, touchpads, scanning devices, voice or optical recognition devices, or any other devices suitable for entering or retrieving data by one or more computing nodes 1600. Multiple input/output devices 1650 may be present in computing node 1600 or may be distributed on various computing nodes of a system that is configured to implement a data storage service. In some embodiments, similar input/output devices may be separate from computing node 1600 and may interact with one or more computing nodes of a system through a wired or wireless connection, such as over network interface 1640.

Storage service clients (e.g., users, subscribers and/or client applications) may interact with a data storage service such as that described herein in various ways in different embodiments, such as to submit requests for service (including, but not limited to, requests to create and/or partition tables, requests to store, retrieve and/or update items in tables, or requests to split, move, or otherwise repartition a table), and to receive results. For example, some subscribers to the service may have physical access to computing node 1600, and if so, may interact with various input/output devices 1650 to provide and/or receive information. Alternatively, other clients/users may use client computing systems to access the system, such as remotely via network interface 1640 (e.g., via the Internet and/or the World Wide Web). In addition, some or all of the computing nodes of a system providing the service may provide various feedback or other general types of information to clients/users (e.g., in response to user requests) via one or more input/output devices 1650.

Those skilled in the art will appreciate that computing node 1600 is merely illustrative and is not intended to limit the scope of embodiments. In particular, the computing system and devices may include any combination of hardware or software that can perform the indicated functions, including computers, network devices, internet appliances, PDAs, wireless phones, pagers, etc. Computing node 1600 may also be connected to other devices that are not illustrated, in some embodiments. In addition, the functionality provided by the illustrated components may in some embodiments be combined in fewer components or distributed in additional components. Similarly, in some embodiments the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computing system via inter-computer communication. Some or all of the system components or data structures may also be stored (e.g., as instructions or structured data) on a computer-readable storage medium or a portable article to be read by an appropriate drive, various examples of which are described above. In some embodiments, instructions stored on a computer-readable storage medium separate from computing node 1600 may be transmitted to computing node 1600 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-readable storage medium. Accordingly, different embodiments may be practiced with other computer system configurations.

Note that while several examples described herein are directed to the application of various techniques in systems that include a non-relational database, in other embodiments these techniques may be applied in systems in which the distributed data store is implemented using a different storage paradigm.

Those skilled in the art will appreciate that in some embodiments the functionality provided by the methods discussed above may be provided in alternative ways, such as being split among more software modules or routines or consolidated into fewer modules or routines. Similarly, in some embodiments illustrated methods may provide more or less functionality than is described, such as when other illustrated methods instead lack or include such functionality respectively, or when the amount of functionality that is provided is altered. In addition, while various operations may be illustrated as being performed in a particular manner (e.g., in serial or in parallel) and/or in a particular order, those skilled in the art will appreciate that in other embodiments the operations may be performed in other orders and in other manners. Those skilled in the art will also appreciate that the data structures discussed above may be structured in different manners, such as by having a single data structure split into multiple data structures or by having multiple data structures consolidated into a single data structure. Similarly, in some embodiments illustrated data structures may store more or less information than is described, such as when other illustrated data structures instead lack or include such information respectively, or when the amount or types of information that is stored is altered. The various methods as depicted in the figures and described herein represent illustrative embodiments of methods. The methods may be implemented in software, in hardware, or in a combination thereof in various embodiments. Similarly, the order of any method may be changed, and various elements may be added, reordered, combined, omitted, modified, etc., in various embodiments.

From the foregoing it will be appreciated that, although specific embodiments have been described herein for purposes of illustration, various modifications may be made without deviating from the spirit and scope of the appended claims and the elements recited therein. In addition, while certain aspects are presented below in certain claim forms, the inventors contemplate the various aspects in any available claim form. For example, while only some aspects may currently be recited as being embodied in a computer readable storage medium, other aspects may likewise be so embodied. Although the embodiments above have been described in considerable detail, numerous variations and modifications will become apparent to those skilled in the art once the above disclosure is fully appreciated. Accordingly, various modifications and changes may be made as would be obvious to a person skilled in the art having the benefit of this disclosure. It is intended that the following claims be interpreted to embrace all such modifications and changes and, accordingly, the above description to be regarded in an illustrative rather than a restrictive sense.

The invention claimed is:

1. A system, comprising:
one or more processors;
a memory coupled to the one or more processors; and
a plurality of storage nodes, each of which comprises one or more storage devices or logical storage volumes;
wherein the memory stores program instructions that when executed by the one or more processors cause the one or more processors to implement a distributed database service;
wherein the distributed database service maintains data in one or more partitions, and wherein to maintain the data in the one or more partitions, the distributed database service is configured to store two or more replicas of each of the one or more partitions on respective storage devices or logical storage volumes of respective ones of the plurality of storage nodes;
wherein an administrative component of the distributed database service is configured to:
store metadata about each of the plurality of storage nodes, wherein the metadata about each storage node comprises an indication of an amount of provisioned throughput capacity or an amount of available throughput capacity for the storage node;
determine that a given one of the plurality of storage nodes is a potential host for a particular partition replica; and
in response to said determining, initiate storage of the particular partition replica on the given storage node;
wherein to determine that the given storage node is a potential host for a particular partition replica, the administrative component is configured to:
receive an indication from the given storage node that the given storage node has sufficient storage capacity to host the particular partition replica; and
determine that the given storage node is a potential host for a particular partition replica based, at least in part, on the received indication and the stored metadata.

2. The system of claim 1, wherein to determine that the given storage node is a potential host for a particular partition replica, the administrative component is further configured to:
send a message to the given storage node, wherein the message specifies an amount of storage capacity associated with the particular partition replica; and
receive a reply message from the given storage node indicating that the given storage node is able to host the particular partition replica.

3. The system of claim 2, wherein the message comprises an indication of a current amount of throughput capacity required for the particular partition replica or a projected amount of throughput capacity for the particular partition replica.

4. The system of claim 2, wherein the message comprises an indication of a current amount of storage capacity required for the particular partition replica or a projected amount of storage capacity for the particular partition replica.

5. The system of claim 2,
wherein the message comprises a reservation request specifying a request to reserve sufficient resource capacity to store the particular partition replica on the given storage node; and
wherein the reply message comprises an acknowledgement that the requested resource capacity has been reserved for the particular partition replica by the given storage node.

6. A method, comprising:
performing by one or more computers:
storing metadata about one or more storage nodes of a distributed data storage system, wherein the distributed data storage system stores data in one or more partitions on respective storage devices or logical storage volumes of the one or more storage nodes, and wherein the metadata about each storage node comprises an indication of an amount of provisioned throughput capacity or an amount of available throughput capacity for the storage node;
determining that a given one of the one or more storage nodes is a potential host for a particular partition; and
in response to said determining, initiate storage of the particular partition on the given storage node;
wherein said determining comprises receiving an indication from the given storage node that the given storage node has sufficient storage capacity to host the particular partition; and
wherein said determining is based, at least in part, on the received indication and the stored metadata.

7. The method of claim 6, wherein said determining further comprises sending a message to the given storage node indicating an intent to store the particular partition on the storage node, wherein the message comprises an indication of a current amount of storage capacity required by the particular partition replica or a projected amount of storage capacity for the particular partition replica.

8. The method of claim 7, wherein said determining further comprises receiving a reply message from the given storage node, wherein the reply message comprises an identifier of a storage device or logical storage volume having sufficient storage capacity to host the particular partition.

9. The method of claim 6, further comprising, prior to said determining:
querying each of the one or more storage nodes to obtain resource capacity information or resource usage information for the storage node;
receiving resource capacity information or resource usage information from each of the one or more storage nodes; and
storing the resource capacity information or resource usage information received from each of the one or more storage nodes as the metadata about the one or more storage nodes.

10. The method of claim 6, wherein the metadata about each storage node further comprises an indication of an amount or percentage of provisioned storage capacity, an amount or percentage of reserved storage capacity, or an amount or percentage of available storage capacity on the storage node.

11. The method of claim 6, wherein the metadata about each storage node further comprises heat information for the storage node or an indication of bursting activity on the storage node.

12. The method of claim 6, wherein the metadata about each storage node comprises an indication of an amount or percentage of provisioned throughput capacity, an amount or percentage of reserved throughput capacity, an amount or percentage of available throughput capacity, an amount or percentage of provisioned storage capacity, an amount or percentage of reserved storage capacity, or an amount or percentage of available storage capacity for each of a plurality of storage devices or logical storage volumes on the storage node.

13. The method of claim 6,
wherein the method further comprises generating a multi-dimensional representation of resource capacity or resource usage for at least some of the one or more storage nodes based, as least in part, on the stored metadata; and
wherein said determining is based, at least in part, on the multi-dimensional representation.

14. The method of claim 13,
wherein the multi-dimensional representation comprises an indication of a target resource utilization; and
wherein said determining comprises determining that storing the particular partition on the given storage node will move a representation of a storage device or logical storage volume of the given storage node in the multi-dimensional representation closer to the indication of the target resource utilization.

15. The method of claim 6, wherein said determining further comprises, prior to said receiving:
selecting a set of storage nodes at random, wherein the randomly selected set of storage nodes comprises the given storage node;
determining that storage nodes in a subset of the randomly selected set of storage nodes have sufficient available throughput capacity for hosting the particular partition, wherein the subset comprises the given storage node; and
querying the given storage node to determine whether the given storage node has sufficient storage capacity to host the particular partition.

16. The method of claim 6, wherein said determining is performed in response to receiving a request to store the particular partition, and wherein the request to store the particular partition is part of an operation to create a table, an operation to divide a table into two or more partitions, an operation to replicate a partition, an operation to move a partition, an operation to split a partition, or an operation to move resource utilization in the distributed data storage system toward a target resource utilization.

17. A non-transitory, computer-readable storage medium storing program instructions that when executed on one or more computers cause the one or more computers to perform:
receiving, by a given one of a plurality of storage nodes of a distributed data storage system that has sufficient available throughput capacity for hosting a particular data partition, a request to reserve resource capacity for hosting the particular data partition, wherein the request comprises an indication of a current amount of storage capacity required by the particular partition or a projected amount of storage capacity for the particular partition, and wherein the distributed data storage system stores data in one or more partitions on respective storage devices or logical storage volumes on respective ones of the plurality of storage nodes; and
determining, by the given storage node, that a storage device or logical storage volume of the given storage node has sufficient available storage capacity for hosting the particular data partition;
reserving, by the given storage node, the storage device or logical storage volume for hosting the particular data partition; and
returning, by the given storage node, an acknowledgement that resource capacity has been reserved for hosting the particular data partition;
wherein said determining is based, at least in part, on the indication in the request and on resource related metadata for one or more storage devices or logical storage volumes of the given storage node that is stored locally on the given storage node.

18. The non-transitory, computer-readable storage medium of claim 17,
wherein the resource related metadata that is stored locally on the given storage node comprises metadata indicating which, if any, of the one or more storage devices or logical storage volumes have available storage capacity falling within each of a plurality of available storage capacity ranges; and
wherein said determining comprises determining that the storage device or logical volume has an amount of available storage capacity within highest storage capacity range.

19. The non-transitory, computer-readable storage medium of claim 18,
wherein the request to reserve resource capacity for hosting the particular data partition is received from the administrative component of the distributed data storage system; and
wherein said returning comprises returning the acknowledgement to the administrative component of the distributed data storage system.

20. The non-transitory, computer-readable storage medium of claim 17,
wherein the resource related metadata that is stored locally on the given storage node comprises metadata indicating the amount of available throughput capacity for the given storage node;
when executed on the one or more computers, the program instructions further cause the one or more computers to perform, prior to said receiving, sending the metadata indicating the amount of available throughput capacity for the given storage node to an administrative component of the distributed data storage system.

* * * * *